United States Patent
Hamada

(10) Patent No.: US 11,307,213 B2
(45) Date of Patent: Apr. 19, 2022

(54) SPECIMEN PROCESSING APPARATUS AND SPECIMEN PROCESSING METHOD

(71) Applicant: SYSMEX CORPORATION, Kobe (JP)

(72) Inventor: Yuuichi Hamada, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 692 days.

(21) Appl. No.: 15/986,076

(22) Filed: May 22, 2018

(65) Prior Publication Data

US 2018/0340953 A1 Nov. 29, 2018

(30) Foreign Application Priority Data

May 29, 2017 (JP) .............................. JP2017-105735

(51) Int. Cl.
*G01N 35/10* (2006.01)
*G01N 1/31* (2006.01)
*G01N 35/00* (2006.01)

(52) U.S. Cl.
CPC .......... *G01N 35/1009* (2013.01); *G01N 1/31* (2013.01); *G01N 35/00* (2013.01); *G01N 35/0095* (2013.01); *G01N 35/1011* (2013.01); *G01N 35/00584* (2013.01); *G01N 2035/00277* (2013.01)

(58) Field of Classification Search
CPC ............... G01N 35/1009; G01N 35/00; G01N 35/0095; G01N 35/1011; G01N 35/00584; G01N 1/31; G01N 2035/00277
See application file for complete search history.

(56) References Cited

U.S. PATENT DOCUMENTS

| | | | |
|---|---|---|---|
| 4,359,447 | A | 11/1982 | Welch |
| 4,931,256 | A | 6/1990 | Mack et al. |
| 5,158,751 | A | 10/1992 | del Valle et al. |
| 2004/0105784 | A1 | 6/2004 | Fukuju et al. |
| 2007/0110617 | A1 | 5/2007 | Nagai et al. |

(Continued)

FOREIGN PATENT DOCUMENTS

| | | |
|---|---|---|
| CN | 1501060 A | 6/2004 |
| CN | 101226203 A | 7/2008 |

(Continued)

OTHER PUBLICATIONS

Office Action dated Nov. 17, 2020 in a counterpart Chinese patent application.

(Continued)

*Primary Examiner* — Benjamin R Whatley
(74) *Attorney, Agent, or Firm* — Metrolex IP Law Group, PLLC

(57) ABSTRACT

A specimen processing apparatus may include: an aspirating tube configured to aspirates a specimen in automatic aspiration and manual aspiration; an aspirating tube moving mechanism configured to move the aspirating tube between a first region in which the automatic aspiration is performed and a second region in which the manual aspiration is performed, the first region covered with a wall, the second region separated from the first region; and a processing unit that processes the specimen aspirated by the aspirating tube.

18 Claims, 17 Drawing Sheets

(56) References Cited

U.S. PATENT DOCUMENTS

| | | | |
|---|---|---|---|
| 2007/0122309 A1* | 5/2007 | Nagai | G01N 35/1004 422/63 |
| 2008/0063568 A1 | 3/2008 | Fukuju et al. | |
| 2008/0219886 A1 | 9/2008 | Fukuju et al. | |
| 2011/0020948 A1 | 1/2011 | Yamato et al. | |
| 2011/0123397 A1 | 5/2011 | Yamato et al. | |
| 2012/0195812 A1 | 8/2012 | Nagai et al. | |
| 2016/0282377 A1 | 9/2016 | Nagai et al. | |
| 2019/0391171 A1 | 12/2019 | Nagai et al. | |

FOREIGN PATENT DOCUMENTS

| | | | |
|---|---|---|---|
| CN | 101246181 A | | 8/2008 |
| CN | 101963621 A | | 2/2011 |
| CN | 102023222 A | | 4/2011 |
| CN | 103217327 A | | 7/2013 |
| CN | 205484349 U | * | 8/2016 |
| CN | 106018052 A | | 10/2016 |
| CN | 206057345 U | | 3/2017 |
| EP | 0515642 B1 | | 10/1995 |
| JP | H09-171026 A | | 6/1997 |
| JP | 2007-139462 A | | 6/2007 |
| JP | 2014-122839 A | | 7/2014 |
| JP | 2014122839 A | * | 7/2014 |
| JP | 2016191634 A | | 11/2016 |
| JP | 2016223922 A | | 12/2016 |
| JP | 2017-044631 A | | 3/2017 |
| JP | 2017-44631 A | | 3/2017 |
| JP | 2017044631 A | | 3/2017 |
| WO | 92/10734 A1 | | 6/1992 |

OTHER PUBLICATIONS

Japanese Office Action dated Mar. 2, 2021 in a counterpart Japanese patent application.
Communication pursuant to Article 94(3) EPC dated Mar. 25, 2021 in a counterpart European patent application.
Office Action dated Aug. 4, 2021 in a counterpart Chinese patent application.
Communication pursuant to Article 94(3) EPC dated Oct. 27, 2021 in a counterpart European patent application.
Chinese Office Action dated Feb. 9, 2022 in a counterpart Chinese patent application.

* cited by examiner

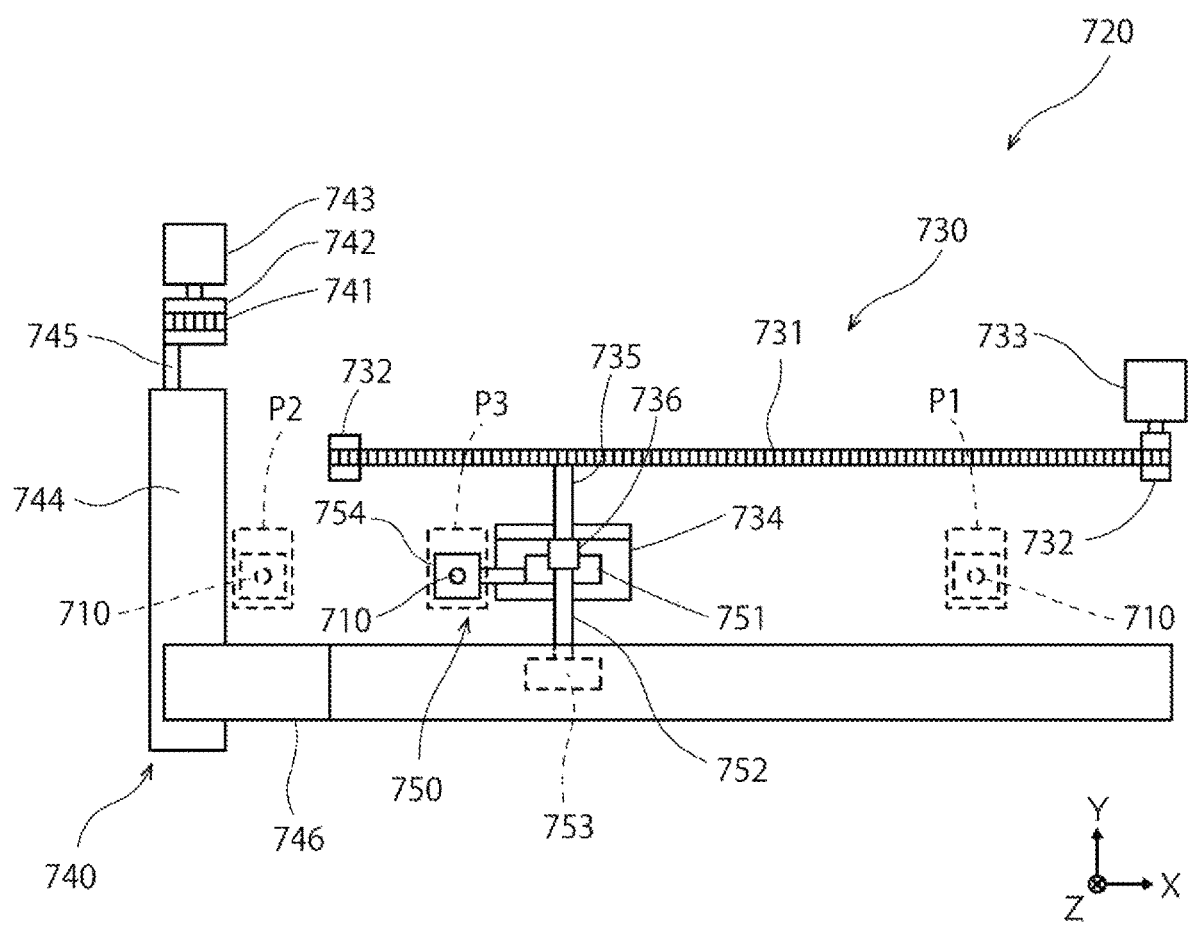
FIG. 4A
FIG. 4B
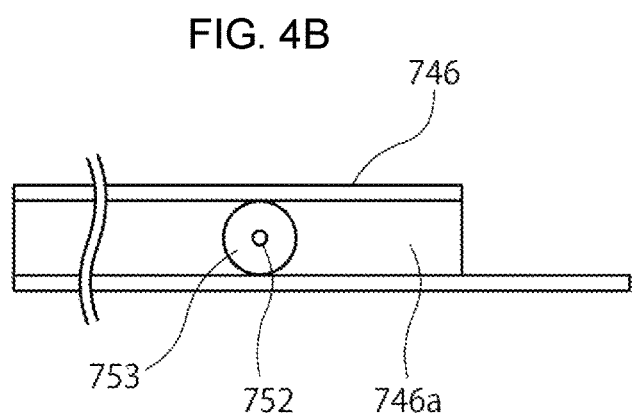
FIG. 4C
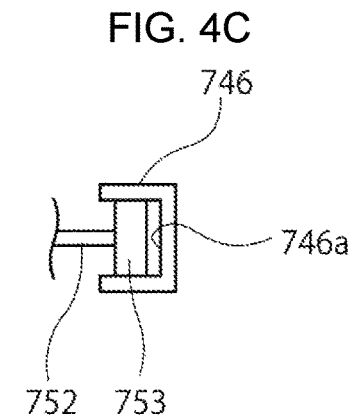

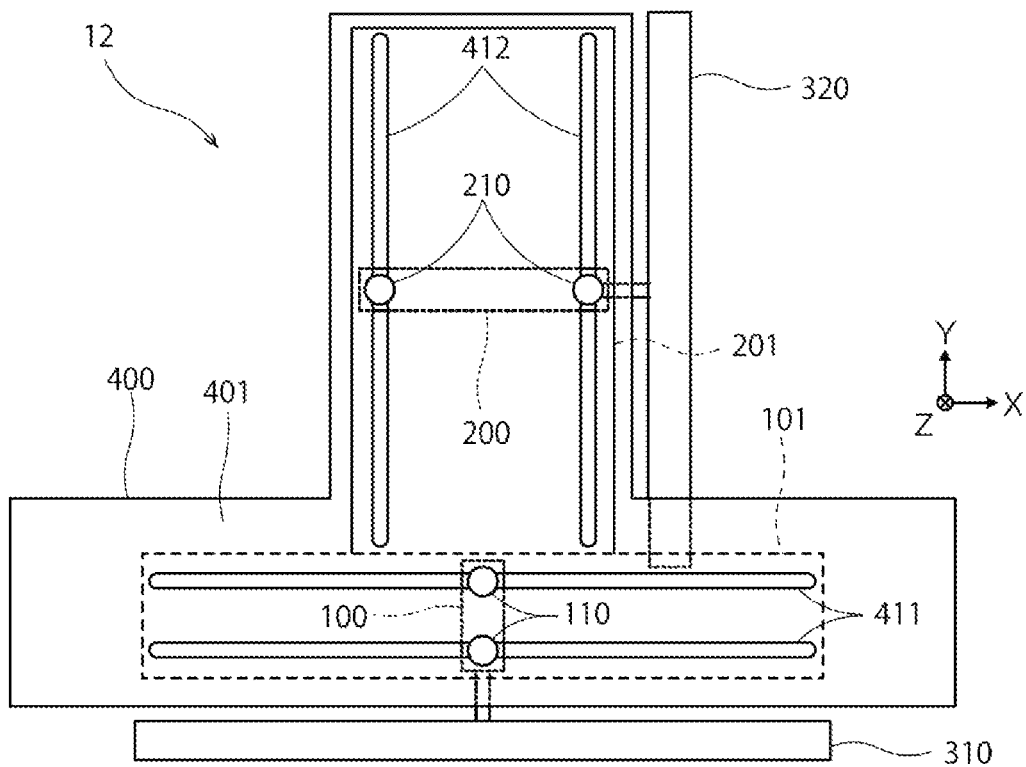
FIG. 7A
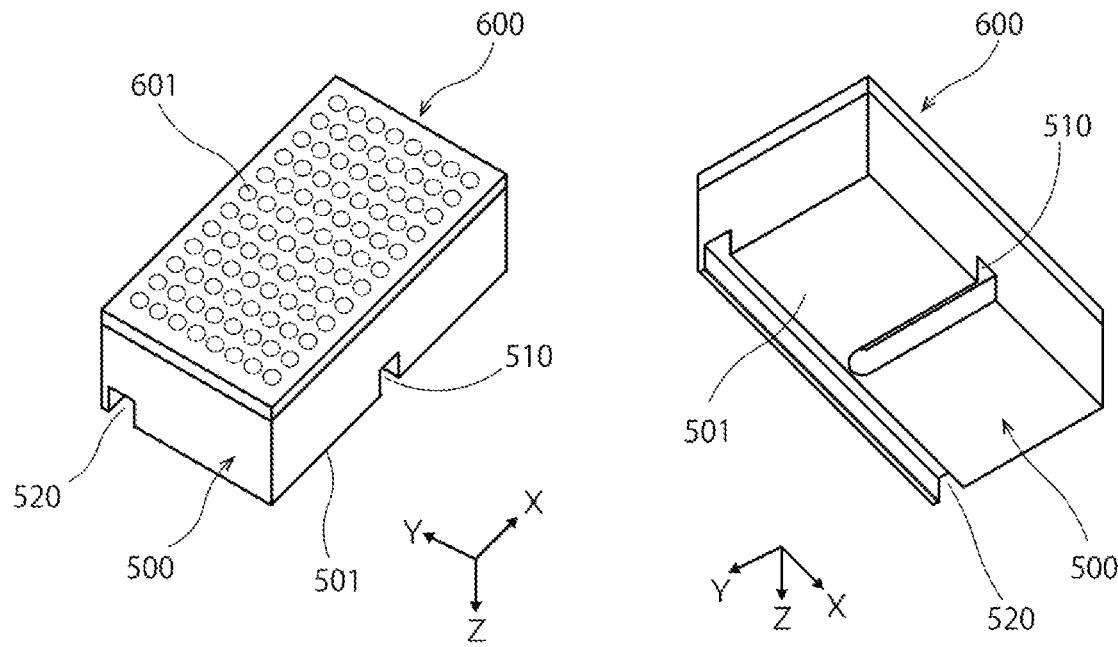
FIG. 7B
FIG. 7C

SPECIMEN PROCESSING APPARATUS AND SPECIMEN PROCESSING METHOD

CROSS REFERENCE TO RELATED APPLICATIONS

This application claims priority from prior Japanese Patent Application No. 2017-105735 filed with the Japan Patent Office on May 29, 2017, the entire contents of which are incorporated herein by reference.

BACKGROUND

The disclosure relates to a specimen processing apparatus and a specimen processing method and more specifically relates to a specimen processing apparatus and a specimen processing method which automatically or manually aspirate specimens and process the specimens.

A specimen processing apparatus that performs a specimen analysis and the like aspirates a specimen such as a sample put in a specimen container and processes the aspirated specimen by making a predetermined analysis or the like to obtain a processing result. Japanese Patent Publication Application No. 2007-139462 (Patent Literature 1) describes a specimen analysis apparatus including a specimen container setting part, a holder setting part, a specimen container supply part, and an aspirator. In the specimen container setting part, a specimen container is set manually. In the holder setting part, a holder to hold one or plural specimen containers are set. The specimen container supply part transfers and supplies the specimen container from the holder set in the holder setting part to the specimen container setting part. The aspirator aspirates a specimen from the specimen container set in the specimen container setting part. The specimen analysis apparatus includes a controller capable of controlling operations of a manual mode and an automatic mode. When the manual mode is selected, the controller performs control so that the specimen in the specimen container manually set in the specimen container setting part is aspirated and analyzed. When the automatic mode is selected, the controller performs control so that the specimen container is transferred from the holder set in the holder setting part to the specimen container setting part, and the specimen in the specimen container set in the specimen container setting part is aspirated and analyzed. The specimen analysis apparatus is capable of holding plural specimen containers in the holder. This eliminates the need for a user to set specimen containers in the specimen analysis apparatus one by one.

In the case of performing processing, such as an analysis, on plural specimens with a specimen processing apparatus, it sometimes takes long time for the specimen processing apparatus to complete the processing for all the specimens after the specimens are set. When a well plate in which all of 96 wells include specimens is set in a specimen processing apparatus, for example, it sometimes requires a time scale of several hours (about seven hours, for example) to process the specimens in all the wells. When another specimen needs to be processed urgently during the processing on the specimens, it is necessary to interrupt the processing in order to urgently process the other specimen. Specifically, it is necessary to control the operation of the specimen processing apparatus so that the continuing automatic processing is suspended and is switched to manual processing of the other specimen.

In order to enable switching between the automatic mode and manual mode, the specimen analysis apparatus described in Patent Literature 1 is configured to enable switching between the automatic mode and manual mode by means of: a transfer mechanism to transfer the specimen container from the holder setting part that holds specimen containers to the specimen container setting part; a mechanism of the specimen container setting part in which the specimen container is set by hand and by operation of the transfer mechanism; a mechanism to move the specimen container setting part to the aspirator; and the like. The mechanisms of the specimen analysis apparatus are thus complicated, and the specimen analysis apparatus disadvantageously becomes large as a whole. Furthermore, in the configuration where the specimen container containing a specimen is drawn into the housing at manual aspiration, like the specimen analysis apparatus described in Patent Literature 1, dust and foreign matter may enter the housing through the opening used to draw the specimen container. Especially at genetic testing, sweat or saliva mixed into specimens will give significant influence on the test result.

SUMMARY

A specimen processing apparatus may include: an aspirating tube configured to aspirates a specimen in automatic aspiration and manual aspiration; an aspirating tube moving mechanism configured to move the aspirating tube between a first region in which the automatic aspiration is performed and a second region in which the manual aspiration is performed, the first region covered with a wall, the second region separated from the first region; and a processing unit that processes the specimen aspirated by the aspirating tube.

A specimen processing method with a specimen processing apparatus may include an aspirating tube configured to aspirate a specimen and a processing unit configured to process the aspirated specimen. The method may include: performing, in a first region covered with a wall, automatic aspiration for a specimen by the aspirating tube; and performing, in a second region separated from the first region, manual aspiration for a specimen by the aspirating tube moved to the second region from the first region.

A specimen processing apparatus may include: an aspirating tube configured to aspirate specimens from a holder that holds the specimens; an aspirating tube moving mechanism that moves the aspirating tube; a specimen transporting mechanism that transports the holder; and a processing unit that processes the specimens aspirated by the aspirating tube. The aspirating tube moving mechanism may move the aspirating tube in a first direction and causes the aspirating tube to aspirate the specimens sequentially. The specimen transporting mechanism may transport the holder in a second direction orthogonal to the first direction.

BRIEF DESCRIPTION OF DRAWINGS

FIG. 4A is a schematic view illustrating the configuration of an aspirating tube moving mechanism when viewed in a positive direction of a Z axis; FIG. 4B is a schematic view illustrating the configuration of a guide member, a roller, and a support shaft when viewed in a negative direction of a Y axis; and FIG. 4C is a schematic view illustrating the configuration of a guide member, a roller, and a support shaft when viewed in a positive direction of an X axis.

FIG. 7A is a schematic view illustrating the configuration of a specimen transporting apparatus when viewed vertically downward; and FIGS. 7B and 7C are schematic views illustrating a holder with a plate installed thereon when viewed from above and below, respectively;

DETAILED DESCRIPTION

Figure 1:
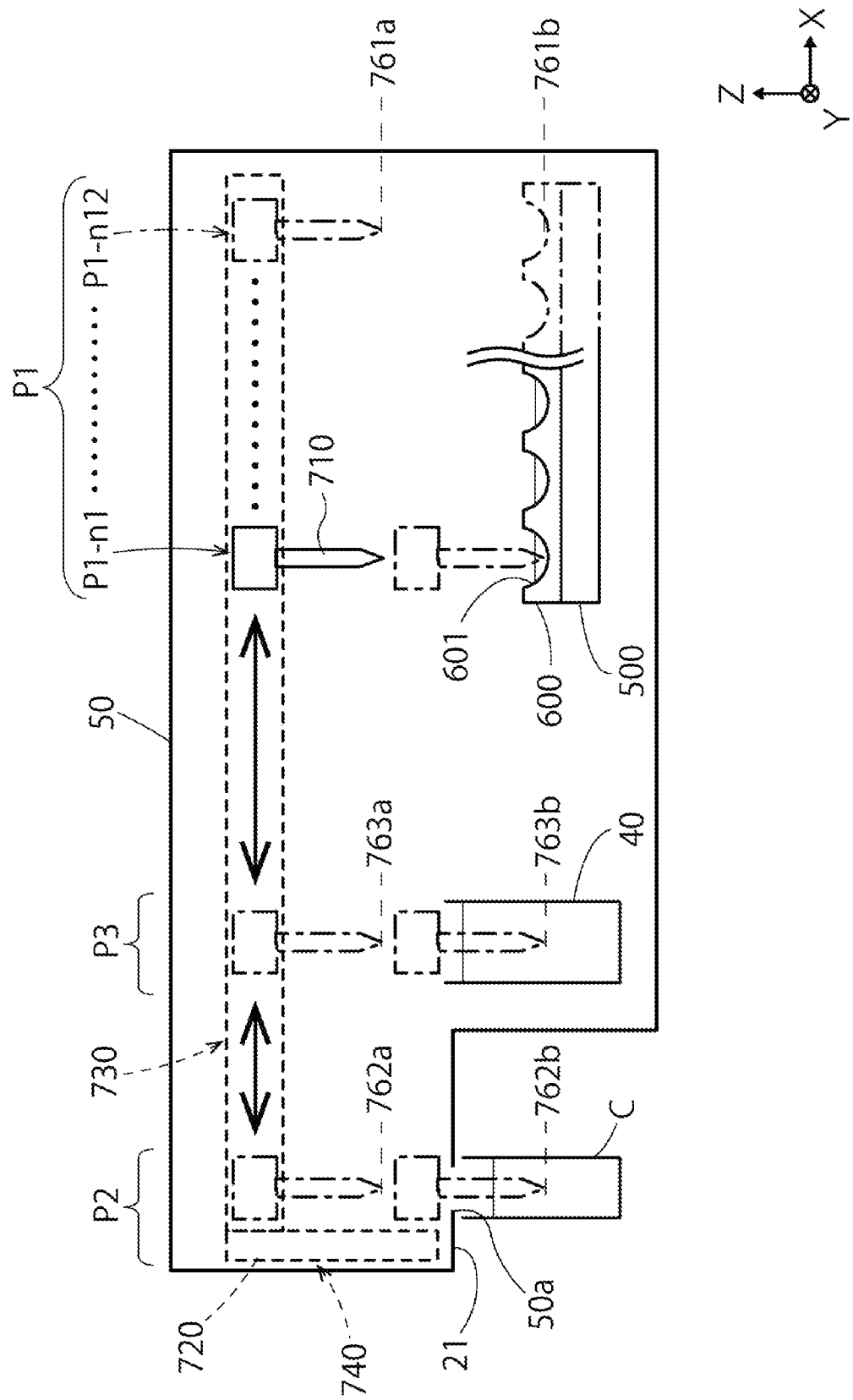
FIG. 1 is a schematic view illustrating movement of an aspirating tube.

A specimen processing apparatus (30) includes: an aspirating tube (710) that aspirates a specimen; an aspirating tube moving mechanism (720) configured to move the aspirating tube (710) to a first region (P1) where to preform automatic aspiration for a specimen and a second region (P2) where to perform manual aspiration for a specimen, the first region (P1) is covered with a wall constituent member, the second region (P2) separated from the first region (P1); and a processing unit (38) that processes the specimen aspirated by the aspirating tube (710).

The aforementioned specimen processing apparatus performs the automatic aspiration in which the aspirating tube sequentially aspirates plural specimens placed in the first region and the manual aspiration in which the aspirating tube aspirates specimens placed in the second region by moving the aspirating tube to the first and second regions. This can simplify the configuration and reduce the size of the specimen processing apparatus. In addition, in the second region, the specimens placed outside the wall constituent member are aspirated with at least the tip of the aspirating tube located outside the wall constituent member. Dust and foreign matter are therefore less likely to enter the inside of the wall constituent member. This prevents contamination of the specimens during the automatic aspiration and implements accurate measurement and the like.

It may be preferable that the specimen processing apparatus further include a housing (50) including the first region (P1) inside. The aspirating tube moving mechanism (720) is configured to move the aspirating tube (710) to the second region (P2) so that the tip of the aspirating tube (710) is located outside the housing (50).

According to the aforementioned configuration, the specimens placed outside the housing are aspirated with the tip of the aspirating tube located outside the housing. Dust and foreign matter are therefore less likely to enter the inside of the wall constituent member. This prevents contamination of the specimens and implements accurate measurement and the like.

It may be preferable that the aspirating tube moving mechanism (720) move the aspirating tube (710) linearly between the first and second regions.

When the positions where aspirating operations in the automatic aspiration and in the manual aspiration are performed are arranged in a linear manner, the aspirating tube is able to move quickly. In addition, the aspirating tube moving mechanism just needs to be a simple mechanism that linearly moves the aspirating tube. The aspirating tube moving mechanism is therefore reduced in size.

It may be preferable that the specimen processing apparatus further include a specimen transporting mechanism (12) configured to transport to the first region (P1), a holder (500) holding specimens.

According to the aforementioned configuration, the specimens are transported to the first region by the specimen transporting mechanism. The user does not need to set specimens in the first region.

It may be preferable that the aspirating tube moving mechanism (720) cause the aspirating tube (710) to move in a first direction on a line connecting the first region (P1) and second region (P2) and sequentially aspirate specimens and the specimen transporting mechanism (12) causes the holder (500) to move in a second direction, which is orthogonal to the first direction.

In the case where the holder accommodates specimens arranged in plural rows and plural columns, all the specimens accommodated in the holder can be aspirated in the automatic aspiration by sequentially moving the aspirating tube in the first direction with the aspirating tube transporting mechanism and sequentially moving the holder in the second direction with the specimen transporting mechanism. The aspirating tube thereby efficiently aspirates the specimens.

It may be preferable that the housing (50) accommodate the specimen transporting mechanism (12).

The specimens to be transported by the specimen transporting mechanism are accommodated in the housing. The specimens are therefore less likely to be contaminated by dust, foreign matter, and the like.

It may be preferable that the housing (50) accommodate a setting position (421) where to set the holder (500) and a transporting path from the setting position (421) to the first region (P1).

The transporting path is included within the housing. The specimens are therefore less likely to be contaminated by dust, foreign matter, and the like.

It may be preferable that the housing (50) include a lid (11) and that, in a condition in which the lid (11) is open, the holder (500) can be set in the setting position (421).

According to the aforementioned configuration, the specimens can be set in the setting positions quickly by opening the lid.

It may be preferable that the specimen processing apparatus include a cleaner (33) that cleans the aspirating tube (710), on a line connecting the first region (P1) and second region (P2). The aspirating tube moving mechanism (720) is configured to move the aspirating tube (710) to the cleaner (33).

By moving the aspirating tube to the cleaner with the aspirating tube moving mechanism, the aspirating tube can be cleaned each time specimen aspiration is completed. In addition, since the cleaner is located on the line connecting the first and second regions, the aspirating tube only needs to be moved linearly. This prevents the aspirating tube moving mechanism from having a complicated configuration and allows the aspirating tube moving mechanism to be reduced for reduction in size.

It may be preferable that the cleaner (33) is located between the first region (P1) and second region (P2).

The aspirating tube can be moved to the cleaner with a short travel distance whichever the aspirating tube is located in the first or second region.

It may be preferable that the specimen processing apparatus further include a controller (31) that controls an operation of the aspirating tube moving mechanism (720). When receiving an instruction to execute the manual aspiration, the controller (31) controls the aspirating tube moving mechanism (720) so that the aspirating tube (710) moves to the second region (P2).

It may be preferable that the controller (31) control the operation of the aspirating tube moving mechanism (720) so that the aspirating tube (710) moves to the first region (P1) after the manual aspiration is completed or a predetermined period of time passes after the manual aspiration is started.

By moving the aspirating tube to the first region after the manual aspiration is completed, the specimen processing apparatus returns to the automatic aspiration quickly. In addition, the predetermined time is set to a length equal to or more than the time required to complete the manual aspiration. By moving the aspirating tube to the first region after a predetermined period of time passes after the manual aspiration is started, the specimen processing apparatus can return to the automatic aspiration after the manual aspiration is surely completed.

It may be preferable that when receiving an instruction to execute the automatic aspiration during the manual aspiration, the controller (31) control the operation of the aspirating tube moving mechanism (720) so that the aspirating tube (710) moves to the first region (P1) after the manual aspiration is completed or a predetermined period of time passes after the manual aspiration is started.

According to the aforementioned configuration, only when the instruction to execute the automatic aspiration, the specimen processing apparatus can return to the operation of the automatic aspiration after the manual aspiration is started or the predetermined period of time passes after the manual aspiration is started. In addition, the predetermined time is set to a length equal to or more than the time required to complete the manual aspiration after the manual aspiration is started. The specimen processing apparatus thereby returns to the automatic aspiration after the manual aspiration is surely completed.

It may be preferable that the specimen contain nucleic acid and the processing unit process the nucleic acid.

It may be preferable that in the automatic aspiration, the aspirating tube (710) agitate a specimen before the aspirating tube (710) aspirates the specimen.

According to the aforementioned configuration, the particle component contained in a specimen is dispersed uniformly in the specimen. The agitation method may be either suction and discharge agitation or bubbling agitation. In the manual aspiration, the user or the like already agitates the specimen before the aspirating operation in many cases, and the operation to agitate the specimen does not need to be performed but may be performed.

It may be preferable that the automatic aspiration be a process in which the aspirating tube (710) aspirates specimens from a holder (500) that holds the specimens.

It may be preferable that the manual aspiration be a process in which the aspirating tube (710) aspirates a specimen from a specimen container held by the user.

It may be preferable that the processing unit (38) be a flow cytometer.

It may be preferable that the housing (50) include an opening, and the aspirating tube moving mechanism (720) be configured to move the aspirating tube (710) so that the tip of the aspirating tube (710) is located outside the housing (50) through the opening.

By locating only the tip of the aspirating tube outside the housing through the opening of the housing during the manual aspiration, dust, foreign matter, and the like are less likely to enter the housing. This prevents contamination of specimens and allows for accurate measurement or the like.

It may be preferable that the holder (500) be configured to accommodate specimens arranged in rows and columns.

All the specimens accommodated in rows and columns in the holder can be aspirated by sequentially moving the aspirating tube in the first direction with the aspirating tube transporting mechanism and sequentially moving the holder in the second direction with the specimen transporting mechanism. This enables the aspirating tube to efficiently aspirate the specimens.

A specimen processing method according to one or more embodiments is a method that processes specimens with a specimen processing apparatus including: an aspirating tube (710) that aspirates a specimen and a processing unit (38) that processes the aspirated specimen. The method includes: performing automatic aspiration for specimens with the aspirating tube (710) in a first region (P1) covered with a wall constituent member; and moving the aspirating tube (710) to a second region (P2) separated from the first region (P1) and performing manual aspiration for a specimen with the aspirating tube (710) in the second region (P2).

According to the aforementioned method, the automatic aspiration and manual aspiration are performed by moving the aspirating tube to the first and second regions. This can simplify the configuration of the specimen processing apparatus and reduce the size. Moreover, the specimen placed outside the wall constituent member is aspirated with the tip of the aspirating tube located outside the wall constituent member. Dust and foreign matter are thereby less likely to enter the inside of the wall constituent member. This prevents contamination of the specimens during the automatic aspiration and allows for accurate measurement and the like.

A specimen processing apparatus according to one or more embodiments includes: an aspirating tube (710) that aspirates specimens from a holder (500) that holds the specimens; an aspirating tube moving mechanism (720) that moves the aspirating tube (710); a specimen transporting mechanism (12) that transports the holder (500); and a processing unit (38) that processes the specimens aspirated with the aspirating tube (710). The aspirating tube moving mechanism (720) causes the aspirating tube (710) to move in a first direction and sequentially aspirate the specimens. The specimen transporting mechanism (12) causes the holder (500) to move in a second direction orthogonal to the first direction.

All the specimens arranged in rows and columns and accommodated in the holder can be aspirated in the automatic aspiration by sequentially moving the aspirating tube in the first direction with the aspirating tube transporting mechanism and sequentially moving the holder in the second direction with the specimen transporting mechanism. This enables the aspirating tube to efficiently aspirate the specimens.

According to one or more embodiments, both the automatic aspiration and manual aspiration are performed by moving one aspirating tube to the first and second regions. This can simplify the configuration of the specimen processing apparatus and reduce the size thereof. Moreover, specimens located outside the wall constituent member are aspirated with the tip of the aspirating tube located outside the wall constituent member. Dust, foreign matter, and the like are therefore less likely to enter the inside of the wall constituent member. This can prevent contamination of specimens during the automatic aspiration and enables accurate measurement and the like.

FIG. 1 schematically illustrates automatic aspiration and manual aspiration carried out by an aspirating tube 710. Herein, the automatic aspiration refers to a process to perform, in a first region P1 illustrated in FIGS. 1 and 9A, aspirating operation for each of plural specimens placed in a holder 500 while moving the aspirating tube 710 and holder 500. The aspirating operation in the automatic aspiration is controlled by a controller 31 described later. The aspirating operation in the automatic aspiration includes a process to move the aspirating tube 710 to a third region P3 and perform cleaning operation for the aspirating tube 710 and the like each time the aspirating operation for one specimen is completed. This series of operations is also referred to as sampler aspiration.

The manual aspiration refers to a process to perform, in a second region P2 illustrated in FIG. 1, the aspirating operation for a specimen placed outside the housing 50 when an instruction to execute manual aspiration is given during the automatic aspiration. The aspirating operation in the manual aspiration is controlled by the controller 31 described later. The manual aspiration includes a process to move the aspirating tube 710 to the third region P3 and perform cleaning operation for the aspirating tube 710 and the like, after aspiration of specimens is completed. This series of operations is also referred to as hand-operated aspiration.

In the drawings, the X-axis direction is a first direction along the direction of movement of the aspirating tube 710. The Z-axis direction is the direction orthogonal to the X-axis direction. The aspirating tube 710 moves, along the Z-axis direction, between a movement stop position 761a and an aspirating position 761b, between a movement stop position 762a and an aspirating position 762b, and between a movement stop position 763a and a cleaning position 763b. The Y-axis direction refers to the direction orthogonal to the X-axis direction and Z-axis direction. The holder 500 moves along the Y-axis direction as a second direction during the automatic aspiration.

(Entire Configuration of Specimen Processing Apparatus)

Figure 2:
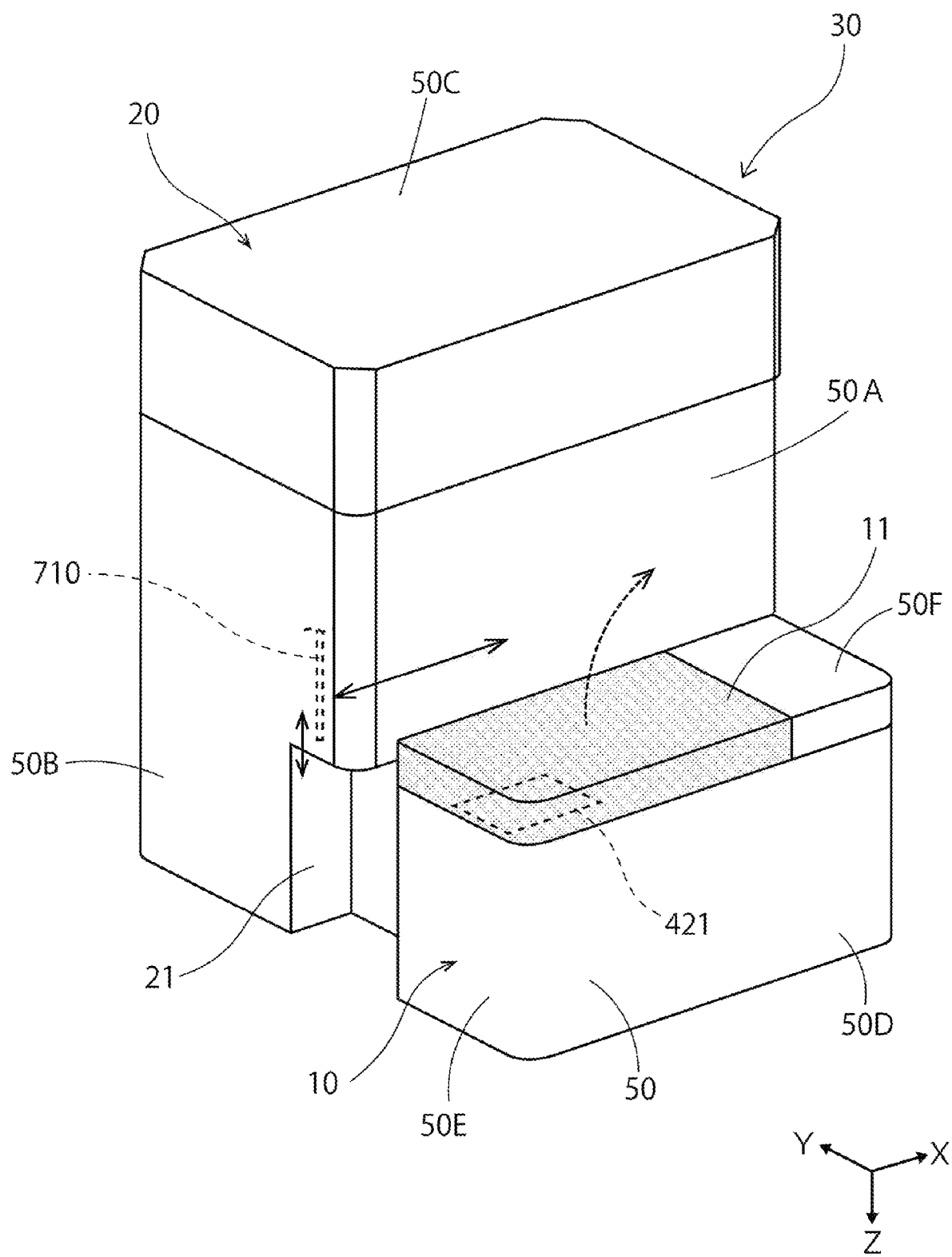
FIG. 2 is a perspective view illustrating the configuration of a specimen processing apparatus.

FIG. 2 illustrates the configuration of a specimen processing apparatus 30, which includes: a processing apparatus 20, which performs specimen aspiration and performs processing, such as a measurement or analysis, and a specimen transporting apparatus 10, which transports a specimen to the processing apparatus 20. The processing apparatus 20 and specimen transporting apparatus 10 are accommodated in the housing 50. The housing 50 includes two side walls 50A (only one is illustrated), a front wall 50B, a top wall 50C, and a not-illustrated rear wall, which cover the processing apparatus 20, and includes a side wall 50D, a front wall 50E, a not-illustrated rear wall, a top wall 50F, and a lid 11, which cover the specimen transporting apparatus 10. These wall constituent members substantially seal the inside of the housing 50.

Figure 3:
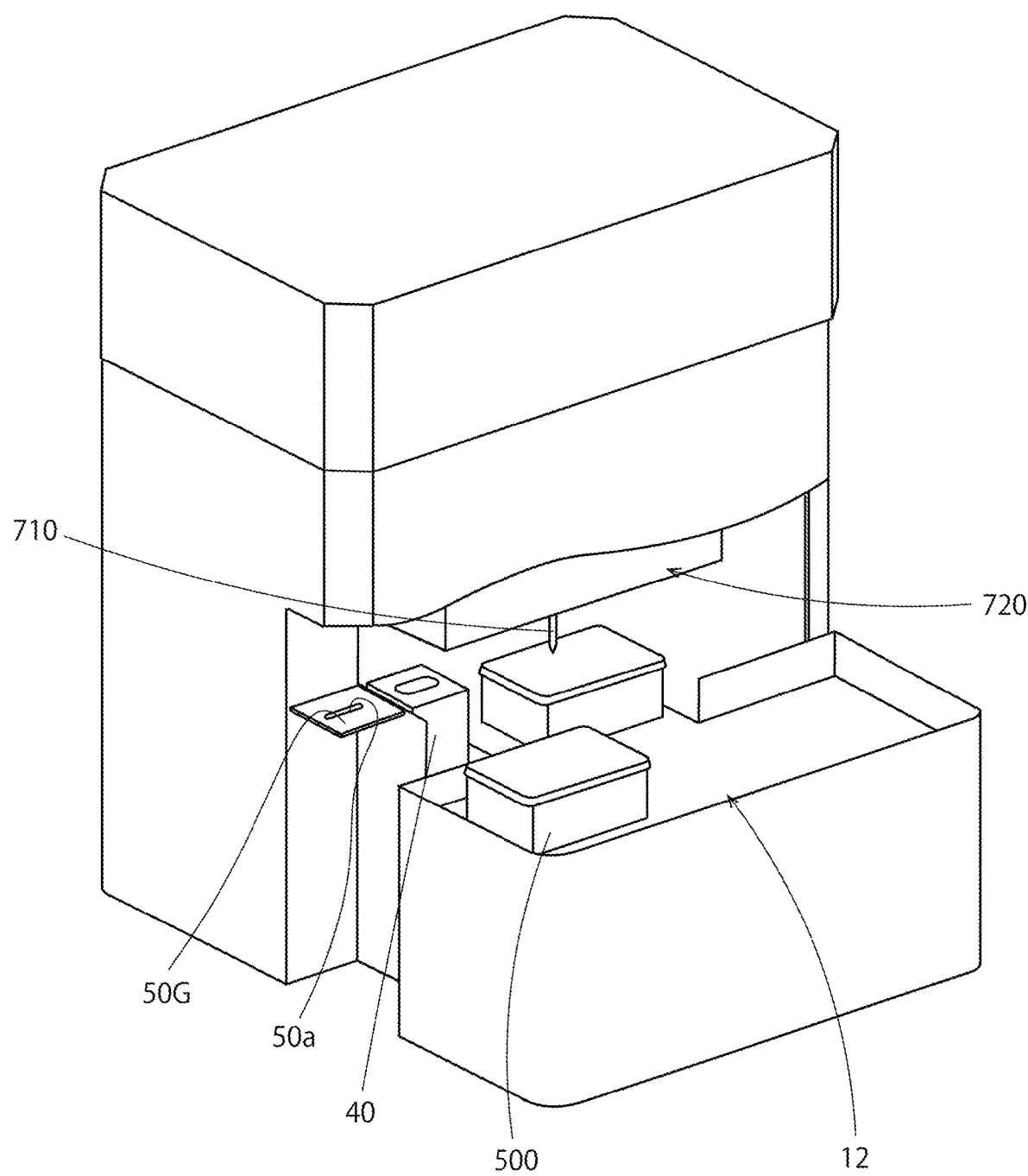
FIG. 3 is a perspective view illustrating a specimen processing apparatus with a housing partially cut away.

In lower part of the front wall 50B of the housing 50, a recess 21 is provided. The recess 21 is a space where the user sets a specimen container C accommodating a specimen, by hand at the manual aspiration. This space is located outside the housing 50. The recess 21 may be provided with a setting member for the specimen container C. As illustrated in FIG. 3, a top plate 50G is provided above the setting position of the specimen container C. In the top plate 50G, a through-hole 50a is formed. At least a tip, an end or a distal end of the aspirating tube 710 is capable of protruding and retracting from the through-hole 50a in the second region P2. The lid 11 is provided in the position corresponding to a setting position 421 of the holder 500 holding specimens and is openable and closable.

FIG. 3 is a diagram of the housing 50 partially cut away. The processing apparatus 20 includes: the aspirating tube 710 that performs specimen-basis aspiration for one or more specimens; an aspirating tube moving mechanism 720 that moves the aspirating tube 710 linearly or in a linear manner between the first region P1 for the automatic aspiration, the second region P2 for the manual aspiration, and a third region P3 for cleaning operation; and a cleaning bath 40 that constitutes a cleaner 33 to clean the aspirating tube 710. The aspirating tube moving mechanism 720 and cleaning bath 40 are accommodated in the housing 50 so that the first and third regions P1 and P3 are included in the housing 50. As illustrated in FIG. 1, the third region P3 is located on a line connecting the first and second regions P1 and P2 and is set between the first and second regions P1 and P2. The line extends along the X-axis direction.

The specimen transporting apparatus 10 includes a specimen transporting mechanism 12 that transports specimens from the setting position 421 to the first region P1 (corresponding to a later-described position 423) within the processing apparatus 20. The specimen transporting mechanism 12 is accommodated in the housing 50. The setting position 421 and a specimen transporting path from the setting position 421 to the first region P1 are included within the housing 50. In the setting position 421, the holder 500 in which the user places specimens is placed.

The first region P1 indicates a region in an X-Y plane where specimens are aspirated in the automatic aspiration. In the automatic aspiration, the aspirating tube 710 sequentially aspirates each of plural specimens placed in plural rows and columns on a later-described plate 600 illustrated in FIG. 7. In the case of aspirating specimens arranged in n columns in the X-axis direction and m rows in the Y-axis direction, the aspirating tube 710 sequentially moves in the X-axis direction from a position P1-$n1$ to a position P1-$nn$ illustrated in FIG. 1, corresponding to the number n of columns of the specimens, for example. The first region P1 is therefore a region including the positions to which the aspirating tube 710 moves, that is, the positions P1-$n1$ to P1-$nn$. The first region P1 also includes a movement stop position 761a at which the aspirating tube 710 linearly reciprocates and an aspirating position 761b at which the aspirating tube 710 aspirates a specimen.

The second region P2 indicates a region in the X-Y plane where a specimen placed in the recess 21 is aspirated in the manual aspiration. As illustrated in FIG. 1, the second region P2 includes a movement stop position 762a and an aspirating position 762b of the aspirating tube 710.

The third region P3 indicates a region in the X-Y plane where cleaning of the aspirating tube 710 is performed during the manual aspiration and automatic aspiration. As illustrated in FIG. 1, the third region P3 includes a movement stop position 763a of the aspirating tube 710 and a cleaning position 763b at which the aspirating tube 710 is cleaned.

Each specimen to be aspirated by the aspirating tube 710 includes cells containing nucleic acids and is a mixture with a reagent for detection. However, specimens are not limited to these.

In one or more embodiments, the recess 21 formed in the housing 50 is opened therearound. However, the recess 21 may be covered with a transparent resin sheet that is openable and closable. The recess 21 does not need to be formed when the tip of the aspirating tube 710 positioned in the aspirating position 762b in the second region P2 is located outside the housing 50.

(Holder)

As illustrated in FIGS. 7B and 7C, the holder 500 in which specimens are placed is configured so that the plate 600 is set on the top surface thereof. In the plate 600, n wells 601 are formed in the X-axis direction, that is, in the column direction, and m wells 601 are formed in the Y-axis direction, that is, in the row direction. The plate 600 of one or more embodiments includes twelve wells 601 arranged in the column direction and eight wells 601 arranged in the row direction, that is, totally 96 wells 601. The distance between centers of adjacent ones of the wells 601 is 9 mm, and the diameter of the upper end of each well 601 is 5.5 mm. The user accommodates a specimen in each well 601 and sets the plate 600 holding the specimens, on the upper surface of the holder 500. The number of the wells 601 formed in the plate 600 needs to be greater than 1, and n or m needs to be not less than 2.

The holder 500 is made of polyacetal, for example. Generally, polyacetal has a small frictional resistance against stainless or an electrolytic zinc-coated steel sheet (SECC) which is a constituent material of a supporting plate 400 illustrated in FIG. 7 described later. The holder 500, which is made of polyacetal, is smoothly transported on a supporting surface 401 illustrated in later-described FIG. 7 in the specimen transporting apparatus 10. The holder 500 is preferably made of a resin material which is easily shaped and has a small frictional resistance against the supporting surface 401.

As illustrated in FIGS. 7B and 7C, in a lower surface 501 of the holder 500, a first depressed portion 510 and a second depressed portion 520 are located. The first depressed portion 510 includes a groove that extends in the Y-axis direction and is formed in the lower surface 501. The second depressed portion 520 includes a groove that extends in the X-axis direction and is formed in the lower surface 501. The first depressed portion 510 is located so as to pass through the central position of the lower surface 501. The second depressed portion 520 is located so as to pass near an edge of the lower surface 501.

(Aspirating Tube Moving Mechanism)

As illustrated in FIG. 4A, the aspirating tube moving mechanism 720 includes first and second moving mechanisms 730 and 740 and a supporter 750. The first moving mechanism 730 includes a belt 731, two pulleys 732, a motor 733, a supporting member 734, an attachment 735, and a rail 736. The belt 731 is laid across the two pulleys 732. The two pulleys 732 are located side by side in the X-axis direction with a predetermined space therebetween. One of the pulleys 732 is connected to the drive shaft of the motor 733. The motor 733 includes a stepping motor. The supporting member 734 is configured to move in the X-axis direction while being supported by a not-illustrated rail. The supporting member 734 is connected to the belt 731 by the attachment 735. The rail 736 extends in the Z-axis direction and is installed on the supporting member 734.

The second moving mechanism 740 includes a belt 741, two pulleys 742, a motor 743, a supporting member 744, an attachment 745, and a guide member 746. The belt 741 is laid across the two pulleys 742. The two pulleys 742 are located side by side in the Z-axis direction with a predetermined space therebetween. FIG. 4A illustrates only one of the pulleys 742 for convenience. The illustrated pulley 742 is connected to the drive shaft of the motor 743. The motor 743 includes a stepping motor. The supporting member 744 is configured to move in the Z-axis direction while being supported by a not-illustrated rail. The supporting member 744 is connected to the belt 741 by the attachment 745. The guide member 746 extends in the X-axis direction and is installed on the supporting member 744.

The supporter 750 includes a sliding member 751, a supporting shaft 752, a roller 753, and a holding member 754. The sliding member 751 is configured to move in the Z-axis direction while being supported by the rail 736. The supporting shaft 752 extends in the Y-axis direction. An end of the supporting shaft 752 is installed on the sliding member 751. The roller 753 is attached to the other end of the supporting shaft 752 so as to rotate about the supporting shaft 752. The holding member 754 is installed on the sliding member 751 and holds the aspirating tube 710.

As illustrated in FIGS. 4B and 4C, the guide member 746 includes a depressed portion 746a extending in the X-axis direction. The roller 753 is accommodated in the depressed portion 746a so as to move in the X-axis direction.

In order for the aspirating tube moving mechanism 720 to move the aspirating tube 710 in the X-axis direction, the motor 733 is driven. The belt 731 thereby moves, and the supporting member 734 moves in the X-axis direction with the movement of the belt 731. While the supporting member 734 moves in the X-axis direction, the sliding member 751 is subjected to a force in the X-axis direction through the rail 736. In this process, the roller 753 is guided within the depressed portion 746a and moves in the X-axis direction. When the sliding member 751 is subjected to the force in the X-axis direction, the holding member 754 moves in the X-axis direction. The aspirating tube 710 thus moves in the X-axis direction.

As illustrated in FIG. 1, therefore, the aspirating tube 710 moves linearly or in a linear manner between the first, second, and third operating positions P1, P2, and P3 in the X-axis direction. As the aspirating tube 710 moves, the aspirating tube 710 is located in the movement stop positions 761a, 762a, and 763a. The movement stop positions 761a, 762a, and 763a are positioned above the aspirating position 761b and 762b and the cleaning position 763b. The movement stop positions 761a, 762a, and 763a are set so that the holder 500 and cleaning bath 40 do not interfere with the movement of the aspirating tube 710 between the first, second, and third positions P1, P2, and P3. In the automatic aspiration, the aspirating tube 710 is sequentially fed by a distance corresponding to the spacing between arrayed specimens. The aspirating tube 710 sequentially moves from position P1-$n1$ to position P1-$nn$ in the first region P1.

In order for the aspirating tube moving mechanism 720 to move the aspirating tube 710 in the Z-axis direction, the motor 743 is driven. The belt 741 thereby moves, and the supporting member 744 and guide member 746 move in the Z-axis direction with the movement of the belt 741. As the guide member 746 moves in the Z-axis direction, the roller 753 sandwiched in the depressed portion 746a is subjected to a force in the Z-axis direction. When the roller 753 is subjected to the force in the Z-axis direction, the sliding member 751 and holding member 754 are moved through the supporting shaft 752 in the Z-axis direction. The aspirating tube 710 thus moves in the Z-axis direction.

As illustrated in FIG. 1, the aspirating tube 710 moves between the movement stop position 761a and the aspirating position 761b for aspiration in the first region P1, moves between the movement stop position 762a and the aspirating position 762b in the second region P2, and moves between the movement stop position 763a and the cleaning position 763b in the third region P3. In the aspirating position 762b in the second region P2, the tip of the aspirating tube 710 moves out of the housing 50. As for the aspirating tube 710, not only the tip thereof but also part close to the proximal end may be out of the housing 50.

(Aspirating Operation)

Figure 5:
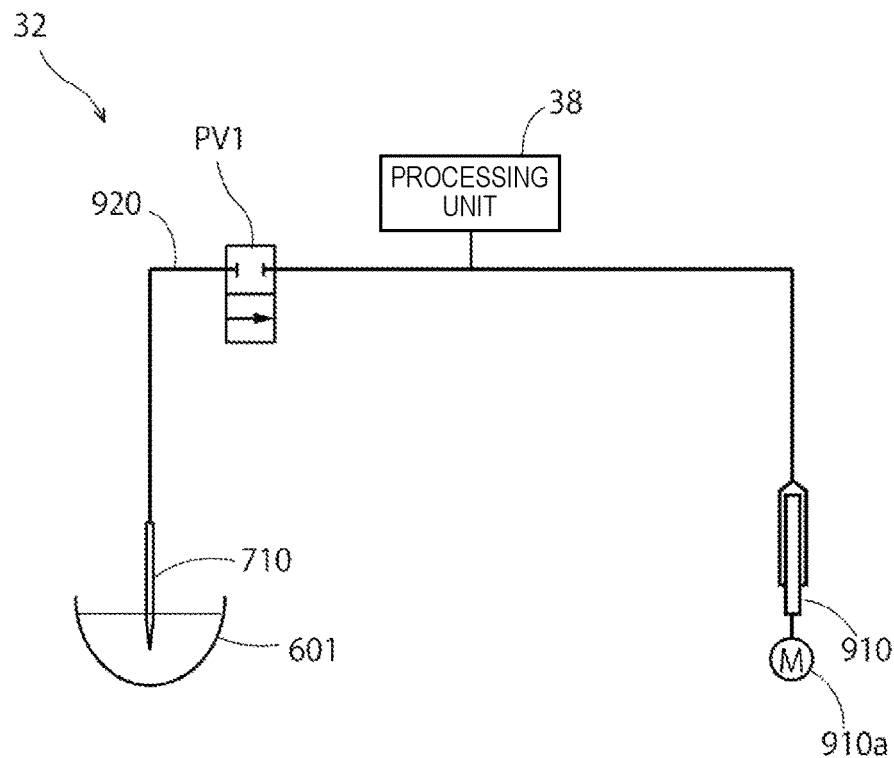
FIG. 5 is a schematic diagram illustrating the configuration of an aspirator.

The specimen processing apparatus 30 includes the aspirator 32 illustrated in FIG. 5. The aspirator 32 includes the aspirating tube 710 and a first pump 910. The aspirating tube 710 and first pump 910 are connected through a main fluid channel 920. The main fluid channel 920 is connected to a later-described processing unit 38. Between the processing unit 38 and aspirating tube 710, an electromagnetic valve PV1 to open and close the main fluid channel 920 is provided. The electromagnetic valve PV1 is always opened. FIG. 5 does not illustrate the holder 500 and plate 600 and schematically illustrates one of the wells 601.

The first pump 910 is a syringe pump, for example. A syringe pump transfers fluid by suction or discharge and is suitable for transfer of a comparatively small amount of fluid. The syringe pump transfers an accurate amount of fluid at an accurate rate. The first pump 910 is operated by a motor 910a. The controller 31 illustrated in FIG. 11 described later controls the motor 910a to cause the first pump 910 to generate aspiration or discharge pressure.

When the aspirating tube 710 is located in the aspirating position 761b in the first region P1, the tip of the aspirating tube 710 is in the specimen accommodated in the well. The controller 31 drives the first pump 910 and causes the first pump 910 to generate suction pressure, so that the specimen is aspirated from the aspirating tube 710 connected through the main fluid channel 920. The aspirated specimen flows into the main fluid channel 920. The first pump 910 stops when a predetermined amount of specimen is aspirated.

When the controller 31 turns the electromagnetic valve PV1 to the closed position and drives the first pump 910 for generation of discharge pressure, the specimen in the main fluid channel 920 is fed to the processing unit 38. When transfer of the specimen to the processing unit 38 is completed, the controller 31 turns the electromagnetic valve PV1 to the open position.

The aforementioned aspirating operation is performed also when the aspirating tube 710 is located in the aspirating position 762b in the second region P2 where the manual aspiration is performed.

(Cleaning Operation)

Figure 6:
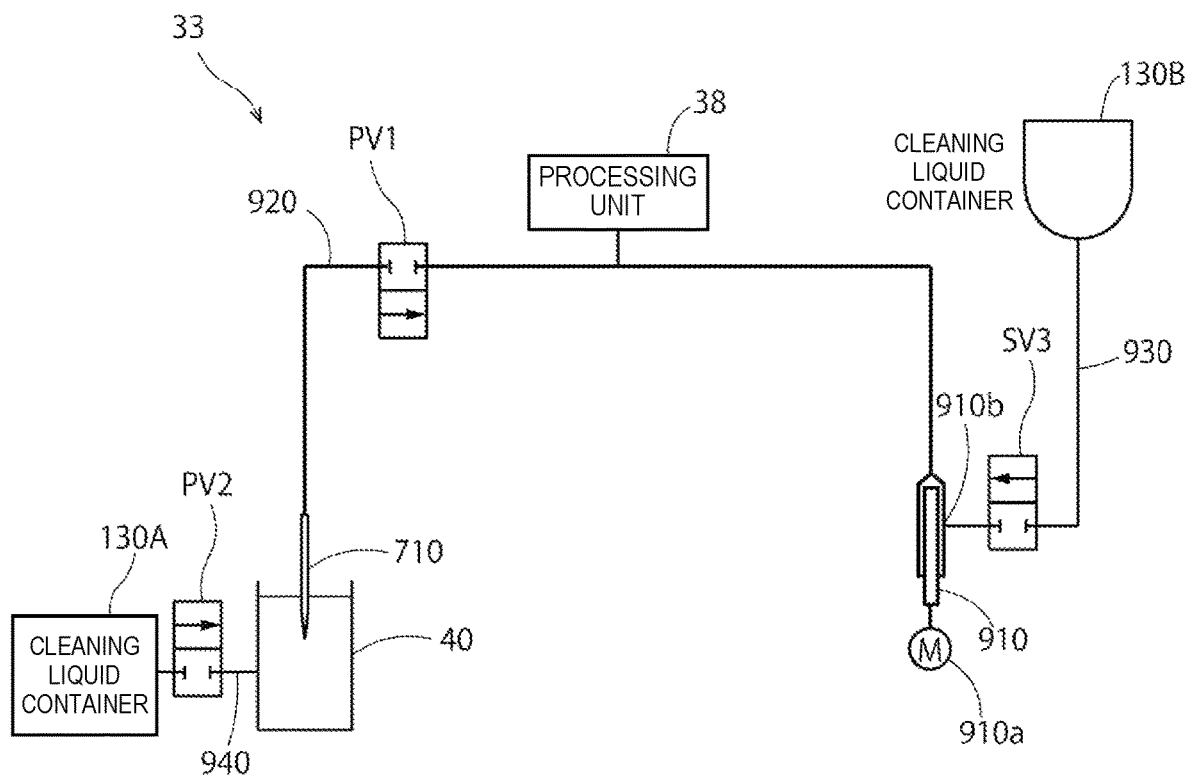
FIG. 6 is a schematic diagram illustrating the configuration of a cleaner.

The specimen processing apparatus 30 includes a cleaner 33 illustrated in FIG. 6. The cleaner 33 includes the cleaning bath 40 and cleaning liquid containers 130A and 130B. The cleaning liquid container 130A is connected to the cleaning bath 40 through a fluid channel 940. In the middle of the fluid channel 940, an electromagnetic valve PV2 is provided. The electromagnetic valve PV2 is always closed. The cleaning liquid container 130B is connected to the first pump 910 through a fluid channel 930. The first pump 910 includes an inlet port 910b through which cleaning liquid is introduced into the first pump 910. The inlet port 910b is connected to the cleaning liquid container 130B. In the middle of the fluid channel 930, an electromagnetic valve SV3 is provided. The electromagnetic valve SV3 is always closed.

When the aspirating tube 710 is located in the cleaning position 763b in the third region P3, at least the tip of the aspirating tube 710 is within the cleaning bath 40. The controller 31 turns the electromagnetic valve PV2 to the open position. By positive pressure applied to the cleaning liquid, the cleaning liquid is supplied to the cleaning bath 40 from the cleaning liquid container 130A through the fluid channel 940. The outer circumference of the tip of the aspirating tube 710 comes into contact with the cleaning liquid to be cleaned. In this process, the aspirating tube 710 may be moved up and down for cleaning. The cleaning liquid supplied to the cleaning bath 40 is discharged through a not-illustrated discharge port. The controller 31 turns the electromagnetic valve PV2 to the closed position.

The controller 31 turns the electromagnetic valve SV3 to the open position. By the positive pressure applied to the cleaning liquid, the cleaning liquid flows from the cleaning liquid container 130B to the liquid channel 930, first pump 910, main fluid channel 920, and aspirating tube 710. The cleaning liquid is then discharged into the cleaning bath 40. The insides of the first pump 910, main fluid channel 920, and aspirating tube 710 are thereby cleaned. After cleaning, the controller 31 turns the electromagnetic valve SV3 to the closed position. The cleaning liquid supplied to the cleaning bath 40 is discharged through a not-illustrated discharge port.

(Agitating Operation)

In the automatic aspiration, the controller 31 causes the aspirating tube 710 to agitate a specimen before causing the aspirating tube 710 to aspirate the specimen. When the first pump 910 is driven for aspiration, the specimen accommodated in the well 601 is aspirated through the aspirating tube 710 and flows into the main fluid channel 920. When the first pump 910 is then driven for discharge, the specimen having flown into the main fluid channel 920 is returned through the aspirating tube 710 to the well 601. The above operations of the aspirating tube 710 to aspirate and discharge specimens are repeated for several times for the operation of suction and discharge agitation.

Specimens may be aspirated and discharged with a nozzle for agitation, a fluid channel for agitation, and a pump which are separately provided. Instead of the aforementioned suction and discharge agitation, bubbling agitation by blowing air into specimens may be performed. In this case, an air pump may be connected to the main fluid channel 920 to blow air through the main fluid channel 920 and aspirating tube 710, or an air channel and a nozzle for agitation to blow air may be separately provided.

(Specimen Transporting Mechanism)

The specimen transporting apparatus 10 includes the specimen transporting mechanism 12 illustrated in FIG. 7A. The specimen transporting mechanism 12 includes a first moving unit 100, a second moving unit 200, a first transporter 310, a second transporter 320, and the supporting plate 400. The supporting plate 400 is made of stainless or an electrolytic zinc-coated steel sheet (SECC), for example. The specimen transporting mechanism 12 transports specimens along a two-dimensional plane. In one or more embodiments, the specimen transporting mechanism 12 transports specimens along the X-Y plane.

The first transporter 310 includes the first moving unit 100 and first protrusions 110 and transports the first protrusions 110 in the X-axis direction together with the first moving unit 100. The second transporter 320 includes the second moving unit 200 and second protrusions 210 and transports the second protrusions 210 in the Y-axis direction together with the second moving unit 200. The first and second moving units 100 and 200 are positioned on the underside of the supporting plate 400, that is, on the positive side of the Z-axis. In the first moving unit 100, a pair of the first protrusions 110 are located. In the second moving unit 200, a pair of the second protrusions 210 are located. The pair of first protrusions 110 are arranged side by side in the Y-axis direction in the first moving unit 100. The pair of second protrusions 210 are arranged side by side in the X-axis direction in the second moving unit 200. The first protrusions 110 engage with the first depressed portion 510 of the holder 500. The second protrusions 210 engage with the second depressed portion 520 of the holder 500.

A moving path 101 of the first moving unit 100 and a moving path 201 of the second moving unit 200 are configured so as not to intersect when viewed in the Z-axis direction. The mechanism to drive the first transporter 310 and the mechanism to drive the second transporter 320 can be individually disposed without coming into contact with each other. This simplifies the configurations of the first and second transporters 310 and 320.

The supporting surface 401 is the top surface of the supporting plate 400 formed into a flat plate. The lower surface 501 of the holder 500 is placed on the supporting surface 401 in the movement range of the holder 500. The holder 500 is thereby supported by the supporting surface 401 and is smoothly transported on the supporting surface 401. The lower surface 501 of the holder 500 may be supported by only the first protrusions 110 and second protrusions 210 so as to be separated from the supporting surface 401.

In the supporting plate 400, a pair of first grooves 411 and a pair of second grooves 412 are formed. The pair of first grooves 411 extend in the X-axis direction. The pair of second grooves 412 extend in the Y-axis direction. The pair of first protrusions 110 protrude above the supporting surface 401 through the pair of first grooves 411. The pair of second protrusions 210 protrude above the supporting surface 401 through the pair of second grooves 412.

Next, transportation of the holder 500 is described with reference to FIGS. 8A to 9B. In FIGS. 8A to 9B, the first and second moving units 100 and 200, first and second transporters 310 and 320, and plate 600 are not illustrated for convenience.

Herein, the position of the holder 500 in which the holder 500 is positioned at the end of the supporting surface 401 on the negative side of the X-axis is indicated by the position 421. The position 421 is the setting position of the holder 500. The position of the holder 500 when the holder 500 is positioned at the end of the supporting surface 401 on the positive side of the X-axis is indicated by a position 424. The position of the holder 500 when the holder 500 is positioned in the middle between the positions 421 and 424 is indicated by a position 422. The position of the holder 500 when the holder 500 is positioned on the positive end side of the supporting surface 401 along the Y-axis is indicated by the position 423.

The position 423 is a region to coincide on the X-Y plane with the first region P1 where to perform automatic aspiration. In the automatic aspiration, the specimen transporting mechanism 12 sequentially feeds the holder 500 toward the negative end of the Y-axis by a distance corresponding to the spacing between the arrayed specimens, from the position P1-$m1$ to the position P1-$mm$ in accordance with the number m of rows of the specimens. The position 423 therefore is a region including the positions to which the holder 500 moves, that is, the positions P1-$m1$ to P1-$mm$.

Figure 8A:
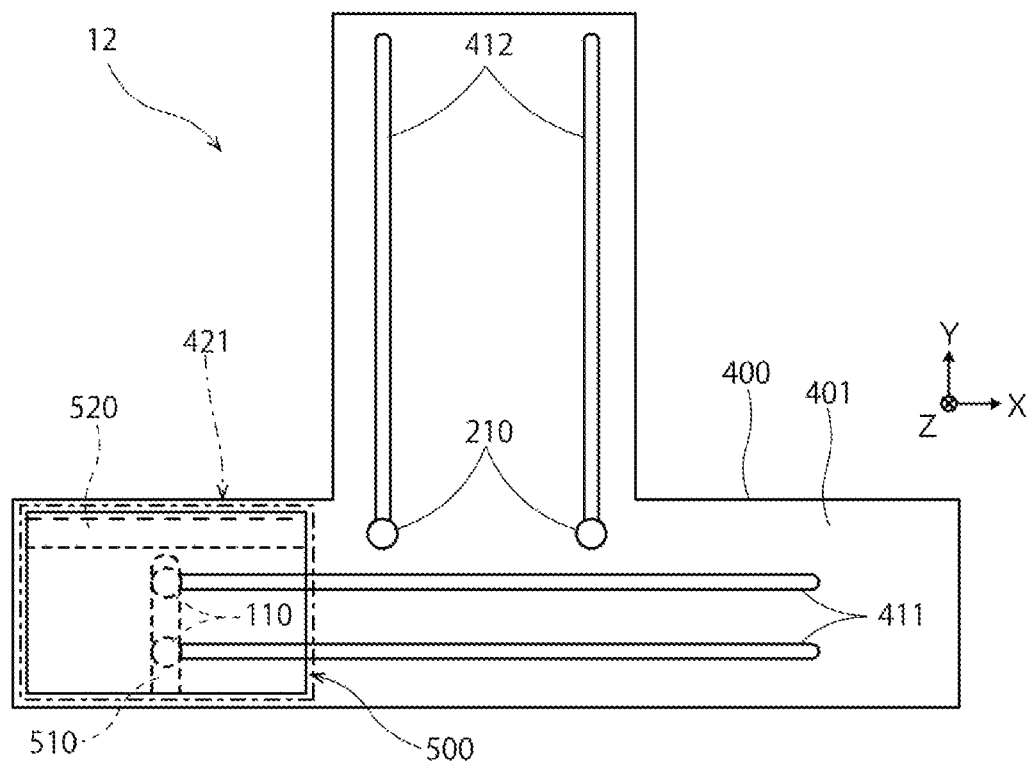
FIGS. 8A and 8B are schematic views illustrating transportation of a holder.

As illustrated in FIG. 8A, the holder 500 is located on the supporting surface 401 so that the pair of first protrusions 110, which are positioned at the ends of the first grooves 411 on the negative side of the X-axis, engage with the first depressed portion 510. The holder 500 is thereby positioned in the position 421. In this process, the first protrusions 110 are fit in the first depressed portion 510, and the lower surface 501 of the holder 500 is supported by the supporting surface 401. Subsequently, the second protrusions 210 are positioned at the ends of the second grooves 412 on the negative side of the Y-axis.

Figure 8B:
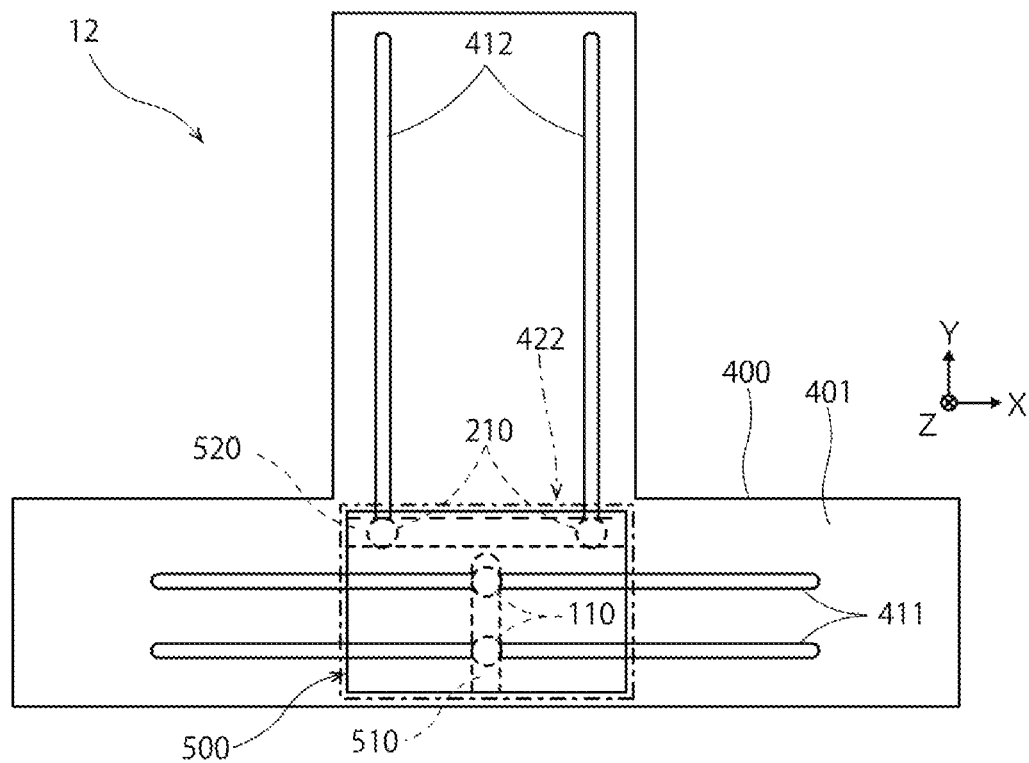

Starting from the state of FIG. 8A, the first protrusions 110 are moved in the positive direction of the X-axis. The first protrusions 110 thereby press the wall of the first depressed portion 510, so that the holder 500 is transported in the positive direction of the X-axis. In this process, when the holder 500 comes to the positions of the second protrusions 210, the second protrusions 210 enter the second depressed portion 520 from the end of the second depressed portion 520 on the positive side of the X-axis. When the first protrusions 110 move to the central positions of the first grooves 411 in the X-axis direction, as illustrated in FIG. 8B, the pair of second protrusions 210 are fit in the second depressed portion 520. The holder 500 is thus positioned in the position 422.

Figure 9A:
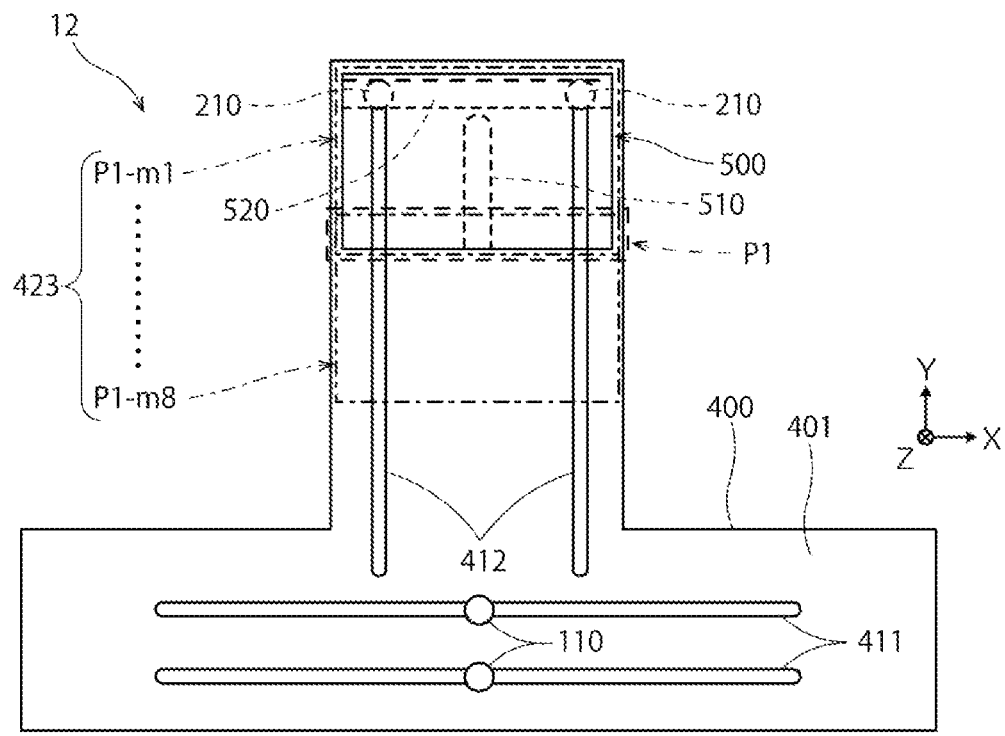
FIGS. 9A and 9B are schematic views illustrating transportation of a holder.

Subsequently, in the state of FIG. 8B, the second protrusions 210 are moved in the positive direction of the Y-axis. The second protrusions 210 press the wall of the second depressed portion 520, so that the holder 500 is transported in the positive direction of the Y-axis. With the movement of the holder 500, the first protrusions 110 go out of the holder 500 through the end of the first depressed portion 510 on the negative side of the Y-axis. When the second protrusions 210 move to the positive end side of the second grooves 412 on the Y-axis, the holder 500 is positioned in the position 423 as illustrated in FIG. 9A.

Figure 9B:
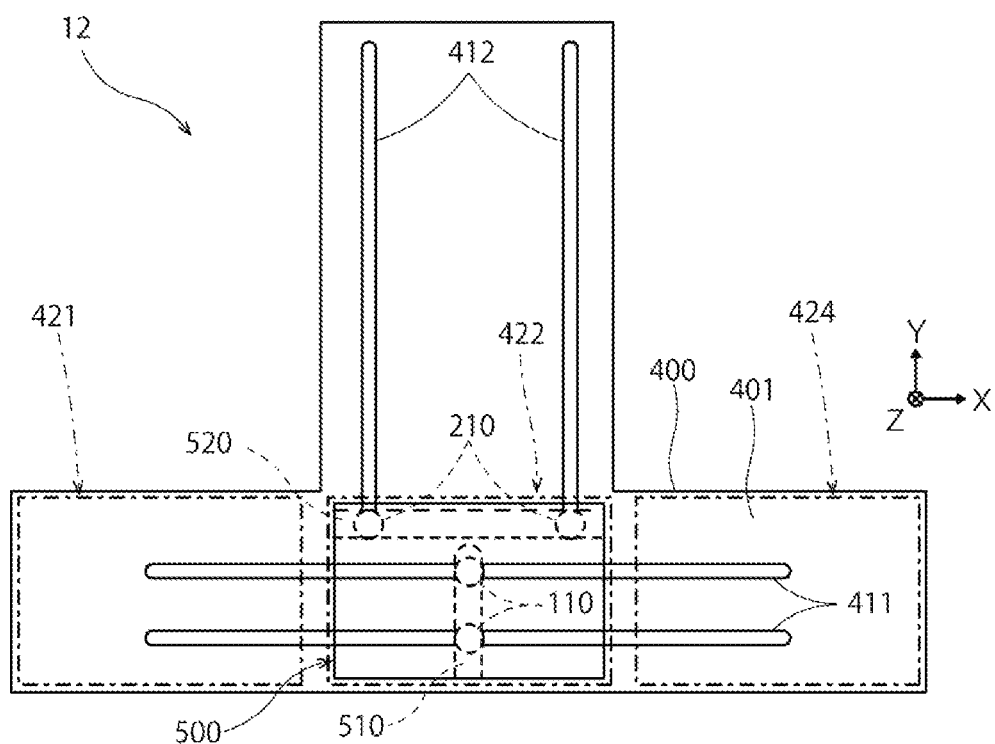

Subsequently, in the state of FIG. 9A, the second protrusions 210 are moved in the negative direction of the Y-axis. The second protrusions 210 press the wall of the second depressed portion 520, so that the holder 500 is transported in the negative direction of the Y-axis. In this process, when the holder 500 comes to the positions of the first protrusions 110, the first protrusions 110 enter the first depressed portion 510 through the end of the first depressed portion 510 on the negative side of the Y-axis. When the second protrusions 210 then move to the ends of the second grooves 412 on the negative side of the Y-axis, as illustrated in FIG. 9B, the pair of first protrusions 110 are fit in the first depressed portion 510. The holder 500 is positioned again in the position 422.

The first protrusions 110 are then moved in the negative direction of the X-axis. The first protrusions 110 thereby press the wall of the first depressed portion 510, so that the holder 500 is transported in the negative direction of the X-axis. In this process, with the movement of the holder 500, the second protrusions 210 go out of the holder 500 through the end of the second depressed portion 520 on the positive side of the X-axis. When the first protrusions 110 move to the ends of the first grooves 411 on the negative side of the X-axis, the holder 500 is positioned in the original position 421. In the state of FIG. 9B, the first protrusions 110 may be moved in the positive direction of the X-axis. In this case, the second protrusions 210 go out of the holder 500 through the end of the second depressed portion 520 on the negative side of the X-axis. The holder 500 is thus positioned in the position 424.

As described above, when the first transporter 310 transports the first moving unit 100 in the positive direction of the X-axis, the holder 500 is subjected to force in the positive direction of the X-axis due to engagement between the first depressed portion 510 and first protrusions 110. Since the second depressed portion 520 extends in the X-axis direction, the second protrusions 210 that engage with the second depressed portion 520 are movable along the second depressed portion 520 in the direction along the X-axis. The holder 500 can therefore move in the positive direction of the X-axis by the force in the positive direction along the X-axis that is given by the movement of the first moving unit 100.

When the second transporter 320 transports the second moving unit 200 in the positive direction of the Y-axis, the holder 500 is subjected to force in the positive direction along the Y-axis due to the engagement of the second depressed portion 520 and second protrusions 210. In this process, since the first depressed portion 510 extends in the Y-axis direction, the first protrusions 110 that engage with the first depressed portion 510 are movable along the first depressed portion 510 in the Y-axis direction. The holder 500 can therefore move in the positive direction of the Y-axis by the force in the positive direction along the Y-axis that is given by the movement of the second moving unit 200.

According to the specimen transporting mechanism 12, the simple configuration using engagement of the first depressed portion 510 and the first protrusions 110 and engagement of the second depressed portion 520 and the second protrusions 210 enables smooth transportation of the holder 500 holding specimens, along the X-Y plane.

The aforementioned specimen transporting mechanism 12 and aspirating tube moving mechanism 720 allow the aspirating tube 710 to aspirate specimens from all the wells 601 of the plate 600 placed on the holder 500 during the operation of the automatic aspiration. Specifically, the aspirating tube moving mechanism 720 sequentially moves the aspirating tube 710 above the wells 601 in the direction of the X-axis by the distance corresponding to the spacing between the specimens in the column direction along the X-axis. The specimen transporting mechanism 12 moves the holder 500 in the direction of the Y-axis by the distance corresponding to the spacing between the specimens in the row direction along the Y-axis. The aspirating tube 710 is therefore able to aspirate a specimen in every well 601.

(Specific Configuration of Specimen Transporting Mechanism)

Figure 10:
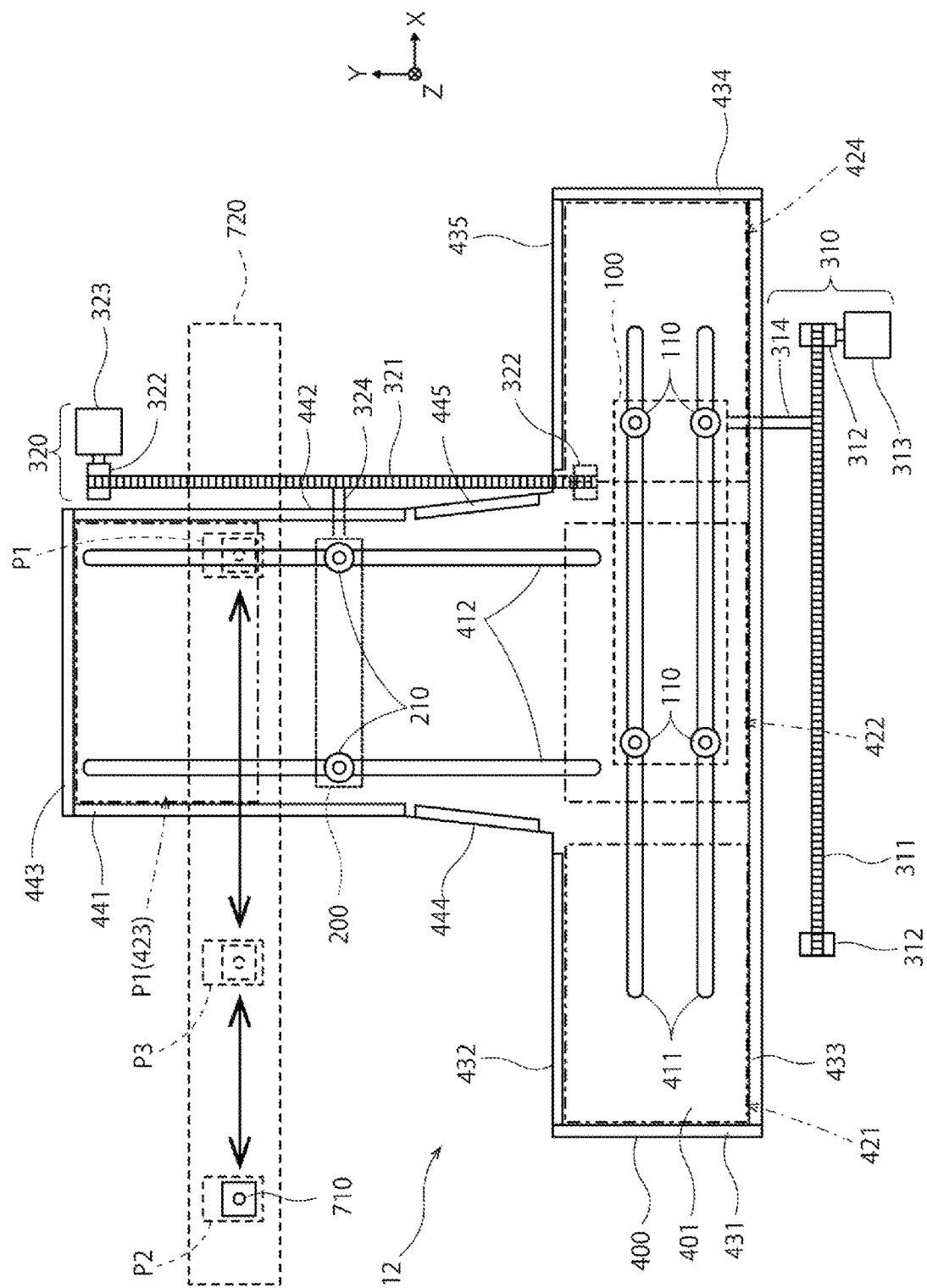
FIG. 10 is a schematic view illustrating the configuration of a specimen transporting apparatus when viewed vertically downward.

Next, the configuration of the specimen transporting mechanism 12 illustrated in FIGS. 8A to 9B is described more specifically. As illustrated in FIG. 10, the first moving unit 100 has a shape elongated in the X-axis direction. The respective pairs of first protrusions 110 are located in the vicinity of the end of the first moving unit 100 on the positive side along the X-axis and in the vicinity of the end thereof on the negative side along the X-axis.

The first transporter 310 includes a belt 311, two pulleys 312, a motor 313, and an attachment 314. The belt 311 is laid across the two pulleys 312. The two pulleys 312 are arranged side by side in the X-axis direction with a predetermined space therebetween. One of the pulleys 312 is connected to the driving shaft of the motor 313. The motor 313 includes a stepping motor. The first moving unit 100 is configured to move in the X-axis direction while being supported on a not-illustrated rail. The first moving unit 100 is connected to the belt 311 with the attachment 314.

In a similar manner, the second transporter 320 includes a belt 321, two pulleys 322, a motor 323, and an attachment 324. The belt 321 is laid across the two pulleys 322. The two pulleys 322 are arranged side by side in the Y-axis direction with a predetermined space therebetween. One of the pulleys 322 is connected to the drive shaft of the motor 323. The motor 323 includes a stepping motor. The second moving unit 200 is connected to the belt 321 with the attachment 324.

The supporting plate 400 includes walls 431 to 435 and 441 to 445 around the supporting surface 401. The walls 431 to 433 surround three side surfaces of the holder 500 positioned in the position 421. The walls 433 to 435 surround three side surfaces of the holder 500 positioned in the position 424. The walls 441 to 443 surround three side surfaces of the holder 500 positioned in the position 423. The holder 500 is surrounded by three of the walls when positioned in the positions 421, 423, and 424 in such a manner. This allows the holder 500 on the supporting surface 401 to be surely positioned in the positions 421, 423, and 424.

In the position 423, the walls 441 and 442 define the position of the holder 500 in the X-axis direction. On the X-Y plane, the positions of the wells 601 of the plate 600 set on the holder 500 coincide with the first region P1 where the aspirating tube 710 aspirates specimens. This allows the aspirating tube 710 to properly aspirate specimens.

The walls 444 and 445 are provided between the positions 422 and 423. From the position 422 toward the position 423, the spacing between the walls 444 and 445 in the X-axis direction changes in width from a width larger than the width of the holder 500 in the X-axis direction to a width substantially equal to the width of the holder 500 in the X-axis direction. In the process of transporting the holder 500 from the position 422 to the position 423, even if the holder 500 is misaligned in the X-axis direction, the walls 444 and 445 allows the position of the holder 500 in the X-axis direction to be gradually aligned with the position of the position 423 in the X-axis direction. The holder 500 is smoothly transferred from the position 422 to the position 423.

(Configuration of Specimen Processing Apparatus)

Figure 11:
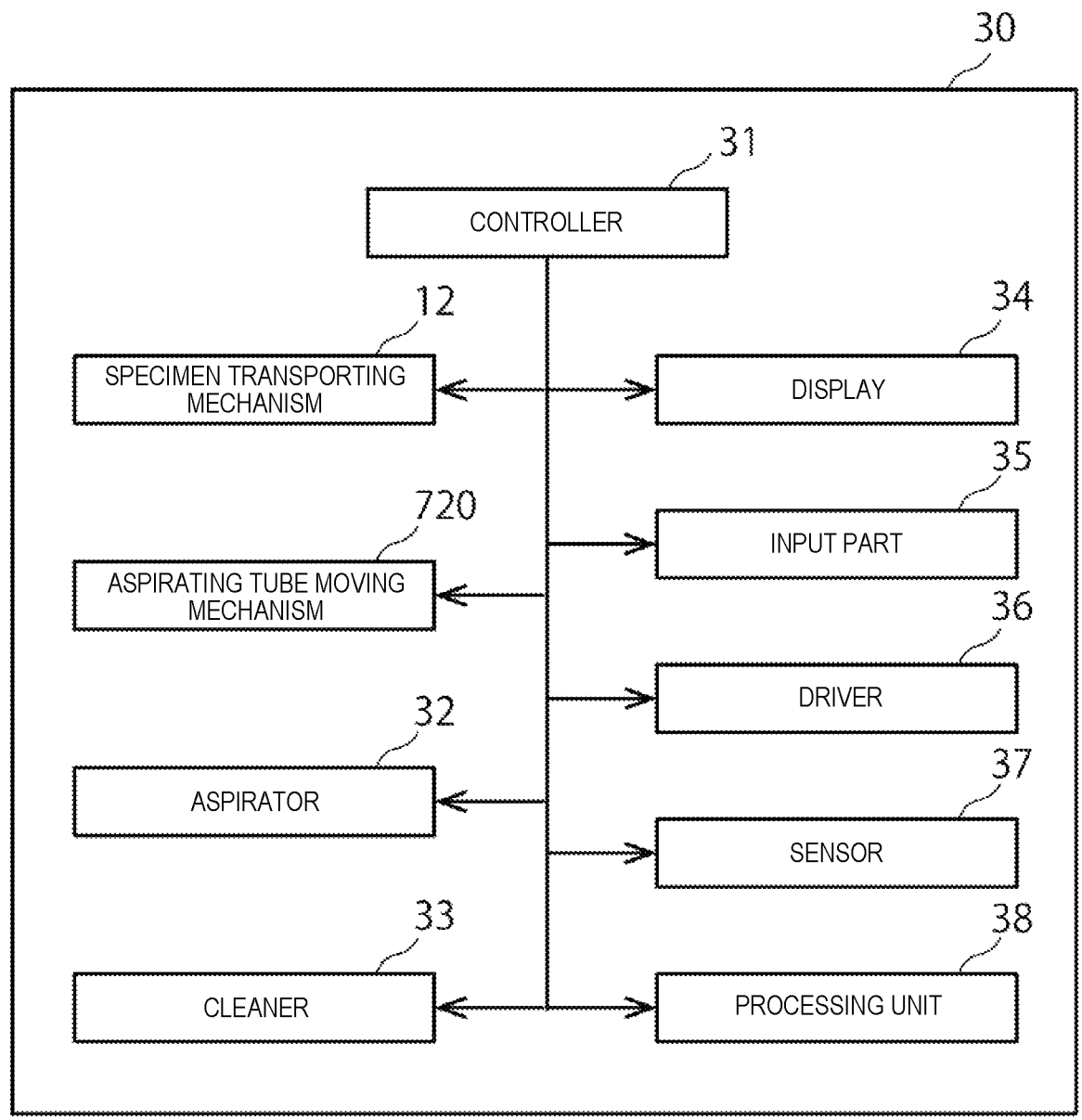
FIG. 11 is a block diagram illustrating the configuration of a specimen processing apparatus.

As illustrated in FIG. 11, the specimen processing apparatus 30 includes the specimen transporting mechanism 12, the aspirating tube moving mechanism 720, controller 31, the aspirator 32, the cleaner 33, a display 34, an input part 35, a driver 36, a sensor 37, and the processing unit 38. The specimen transporting mechanism 12 is located within the specimen transporting apparatus 10. The aspirating tube moving mechanism 720, controller 31, aspirator 32, cleaner 33, display 34, input part 35, driver 36, sensor 37, and processing unit 38 are located within the processing apparatus 20. When the processing apparatus 20 is separately connected to an information processing apparatus, the controller 31, display 34, and input part 35 may be located in the information processing apparatus.

The controller 31 includes: a memory used as a work area for data processing; a storage that records a program and processing data; a central processing unit (CPU) performing predetermined data processing; and an interface performing input and output of data between the controller 31 and each part connected thereto.

In the following description, processes performed by the controller 31 substantially refer to processes performed by the CPU of the controller 31, unless otherwise noted. The CPU temporarily stores necessary data (intermediate data being processed or the like) using the memory as the work area and properly records data to be saved in the storage for the long term. The controller 31 executes a program stored in the storage or memory to control each part connected to the controller 31.

Specifically, when the input part 35 receives an instruction to execute manual aspiration, the controller 31 controls the operation of the aspirating tube moving mechanism 720 so that the aspirating tube 710 moves from the current position to the second region P2. The controller 31 also controls the operation of the specimen transporting mechanism 12. The controller 31 controls specimen agitating operation performed before the aspirating tube 710 aspirates a specimen in the automatic aspiration. In the process of performing aspirating operation for specimens arranged in rows and columns on the holder 500 in the first region P1, the controller 31 controls the operation of the aspirating tube moving mechanism 720 so that the aspirating tube 710 is sequentially fed by a distance corresponding to the spacing between the specimens arranged linearly along the X-axis direction. The controller 31 then controls the operation of the specimen transporting mechanism 12 so that the holder 500 is sequentially fed by a distance corresponding to the spacing between the specimens arranged linearly along the Y-axis direction.

The processing unit 38 performs processing, such as a measurement or analysis, for specimens aspirated in the aspirator 32. The processing unit 38 is an analysis apparatus such as a flow cytometer, for example. The processing unit 38 may be a specimen processing apparatus that performs processing based on BEAMing for aspirated specimens. The processing unit 38 is not limited to these apparatuses. The example of the processing unit 38 is described later.

The display 34 and input part 35 are provided on the side surface and upper surface of the processing apparatus 20, for example. The display 34 is a liquid crystal panel, for example. The input part 35 includes a button, a touch panel, or the like, for example. The driver 36 includes another mechanism provided within the specimen processing apparatus 30. The sensor 37 includes various sensors provided within the specimen processing apparatus 30.

(Automatic Aspiration)

Prior to operation of the automatic aspiration by the specimen processing apparatus 30, the user accommodates specimens in the wells 601 of the plate 600. The user opens the lid 11 of the specimen transporting apparatus 10 as indicated by a dashed arrow in FIG. 2. The holder 500 is positioned in the position 421 as the setting position. The user sets the plate 600 accommodating the specimens, on the holder 500 and closes the lid 11. The holder 500 may be positioned both in the positions 421 and 422.

Figure 12:
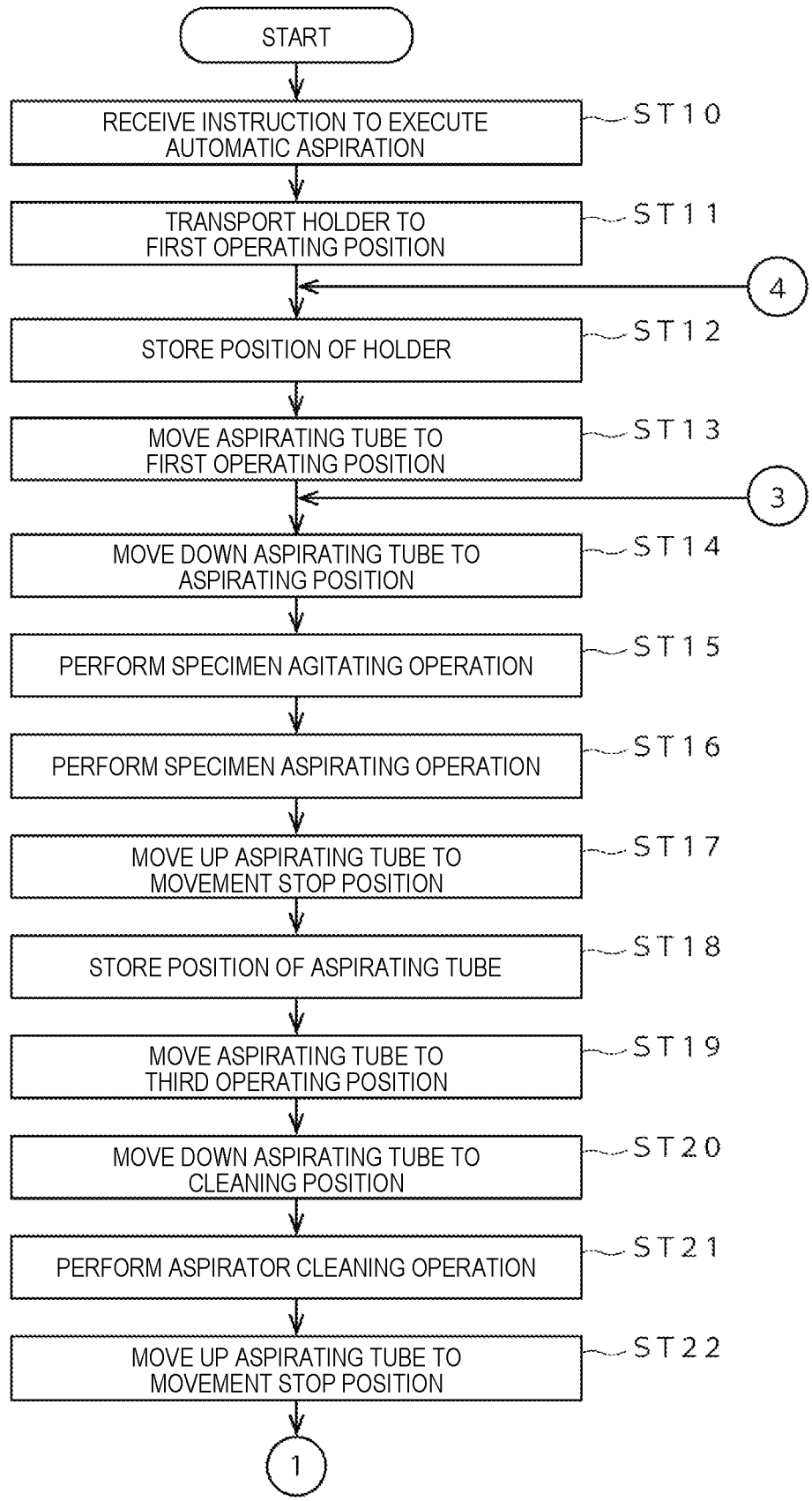
FIG. 12 is a flowchart illustrating the operation of automatic aspiration.

Hereinafter, the operation of the automatic aspiration by the specimen processing apparatus 30 is described using flowcharts in FIGS. 12 and 13. In one or more embodiments, the input part 35 is able to receive an instruction to execute manual aspiration while the following steps ST10 to ST27 are being executed. Instead of the input part 35, a button configured to receive an instruction to execute manual aspiration may be separately provided.

The following description is given for a case where, as illustrated in FIG. 7B, all the wells 601, which include twelve wells 601 arranged in the X-axis direction (column direction) and eight wells 601 arranged in the Y-axis direction (row direction), that is, all the wells 601 formed in eight rows by twelve columns, accommodate specimens to be aspirated. It is unnecessary to accommodate specimens in all the wells 601. In this case, the controller 31 may cause a sensor or the like, for example, to detect the wells 601 that accommodate specimens and then move the aspirating tube 710 and holder 500 in the order of aspiration of specimens previously determined. Alternatively, the user may input information specifying the wells 601 that accommodate the specimens to be aspirated through the input part 35.

When the controller 31 detects that the input part 35 has received an instruction to execute automatic aspiration by the user in ST10, the controller 31 controls the specimen transporting mechanism 12 in ST11 so that the holder 500 is transported from the setting position 421 illustrated in FIG. 8A to the position 422 illustrated in FIG. 8B and to the first region P1 (position 423) illustrated in FIG. 9A. To aspirate specimens placed in the first row, for example, the controller 31 transports the holder 500 to the position P1-$m$1 at which the wells 601 in the first row are located under the first region P1 of the aspirating tube 710. In ST12, the controller 31 stores a current position P1-$mm$ of the holder 500.

In ST13, the controller 31 controls the aspirating tube moving mechanism 720 and moves the aspirating tube 710 to the position of the specimen to be aspirated in the first region P1, for example, the position P1-$n$1.

In ST14, the controller 31 controls the aspirating tube moving mechanism 720 and moves down the aspirating tube 710 from the movement stop position 761$a$ to the aspirating position 761$b$. In ST15, the controller 31 controls the first pump 910 and motor 910$a$ of the aspirator 32 for operation to agitate the specimen. In ST16, the controller 31 controls the first pump 910 and motor 910$a$ of the aspirator 32 for aspirating operation in which the aspirating tube 710 aspirates a previously determined amount of specimen. When the aspirating operation is completed, in ST17, the controller 31 controls the aspirating tube moving mechanism 720 and moves up the aspirating tube 710 from the aspirating position 761$b$ to the movement stop position 761$a$. In ST18, the controller 31 stores the current position of the aspirating tube 710, for example, the position P1-$n$1.

In ST19, the controller 31 controls the aspirating tube moving mechanism 720 and moves the aspirating tube 710 to the third region P3. In ST20, the controller 31 controls the aspirating tube moving mechanism 720 and moves down the aspirating tube 710 from the movement stop position 763$a$ to the cleaning position 763$b$. In ST21, the controller 31 performs cleaning operation for the aspirator 32. In ST22, the controller 31 controls the aspirating tube moving mechanism 720 and moves up the aspirating tube 710 from the cleaning position 763$b$ to the movement stop position 763$a$.

In ST23, the controller 31 determines whether the input part 35 has received an instruction to execute manual aspiration. When the input part 35 has not received an instruction to execute manual aspiration, the controller 31 proceeds to ST 24. When the input part 35 has received an instruction to execute manual aspiration, the controller 31 shifts to the manual aspiration illustrated in FIG. 14.

In ST24, the controller 31 determines whether the aspirating tube 710 has aspirated all the specimens accommodated by the wells 601 in a predetermined row. In one or more embodiments, each row includes twelve wells 601. The controller 31 therefore determines whether the position P1-$nn$ of the aspirating tube 710 stored in ST18 is a position P1-$n$12 corresponding to the twelfth well 601. When the stored position of the aspirating tube 710 is not the position corresponding to the twelfth well 601, the controller 31 proceeds to ST27. In ST27, the controller 31 controls the aspirating tube moving mechanism 720 and moves the aspirating tube 710 to the position shifted from the position of the aspirating tube 710 stored in ST18 by a distance corresponding to the spacing between the arrayed specimens along the X-axis, that is, the next position P1-$n2$, for example. The controller 31 repeats ST14 to ST24 until the aspirating tube 710 completes aspiration of specimens accommodated in all of the twelve wells 601 of the first row. When the aspirating tube 710 completes aspiration of all the specimens in the predetermined row, the controller 31 leaves the aspirating tube 710 in the position P1-$nn$ in the row where the aspirating tube 710 aspirates last time. For aspiration in the next row, although the controller 31 moves the aspirating tube 710 from the position P1-$nn$ in the opposite direction, the controller 31 may always move the aspirating tube 710 to the position P1-$n1$ after aspiration of all specimens in a predetermined row is completed.

When aspiration of all of the specimens in the first row is completed, the controller 31 proceeds to ST25 and determines whether specimens in the wells 601 of all the rows have been aspirated. In one or more embodiments, the wells 601 form eight rows along the Y-axis direction. The controller 31 therefore determines whether the position P1-$mm$ of the holder 500 stored in ST12 is the position P1-$m8$ corresponding to the wells 601 in the eighth row. When the stored position of the holder 500 is the position corresponding to the wells 601 of the eighth row, the controller 31 determines that aspiration of all the specimens accommodated in the wells 601 is completed and terminates the automatic aspiration. When the stored position P1-$mm$ of the holder 500 is not the position corresponding to the wells 601 of the eighth row, the controller 31 proceeds to ST26. The controller 31 controls the specimen transporting mechanism 12 and moves the holder 500 along the Y-axis by the distance corresponding to the spacing between the arrayed specimens. The controller 31 then moves the holder 500 to the next position P1-$m2$, for example. The controller 31 repeats ST12 to ST25 until specimen aspiration is completed for all the rows of the wells 601.

The determination in the ST23 whether the input part 35 has received an instruction to execute manual aspiration may be performed between ST10 and ST13, ST24 and ST25, ST25 and ST14, ST24 and ST27, or ST27 and ST14. This enables quick shift to the manual aspiration when the input part 35 receives an instruction to execute manual aspiration while the automatic aspiration is being performed.

When aspiration is completed for all the specimens accommodated in the wells 601, the controller 31 controls the specimen transporting mechanism 12 and transports the holder 500 from the first region P1 (position 423) to the setting position 421. The user opens the lid 11 and detaches the plate 600 from the holder 500 that has returned to the setting position 421.

(Manual Aspiration)

Figure 13:
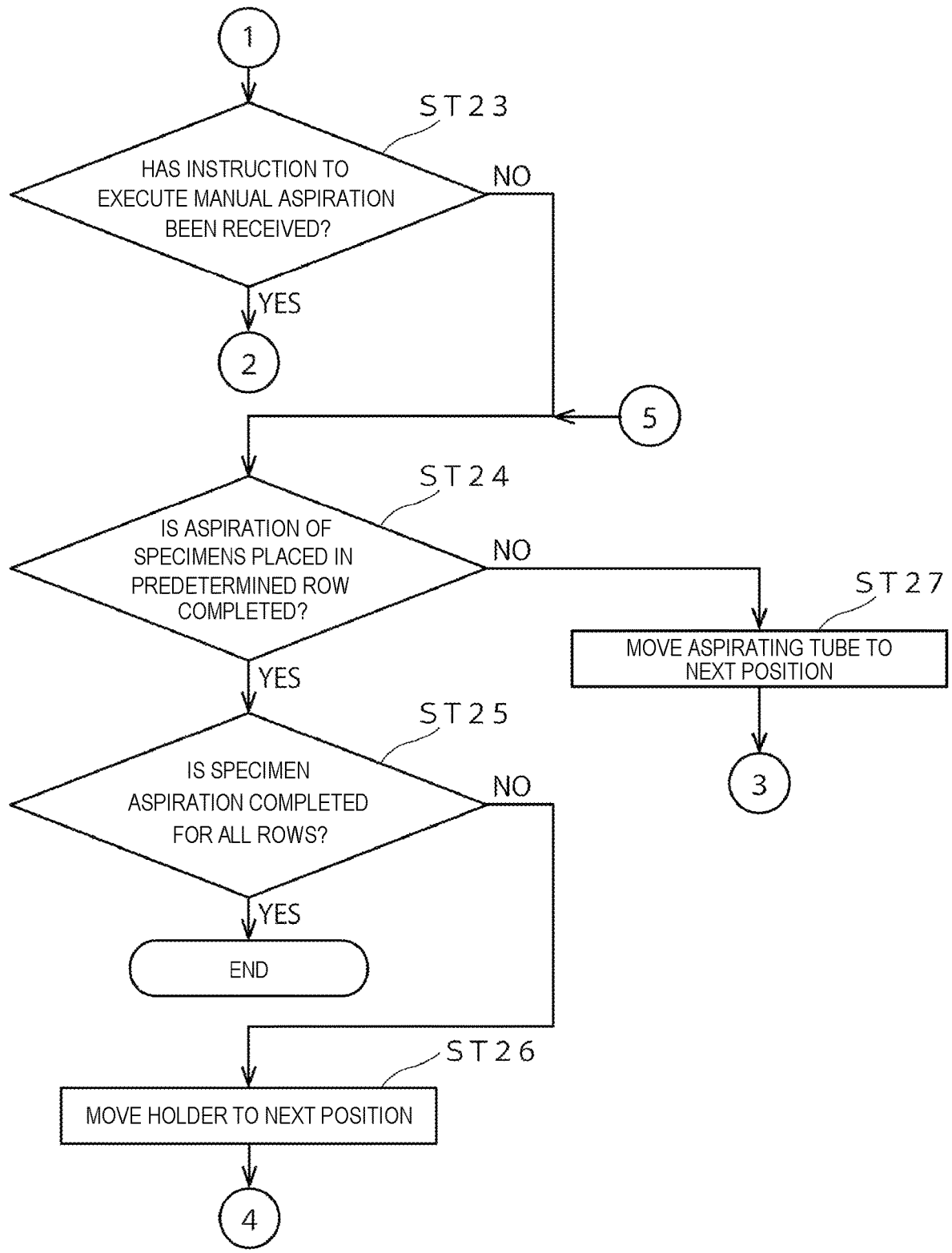
FIG. 13 is a flowchart illustrating the operation of automatic aspiration.
Figure 14:
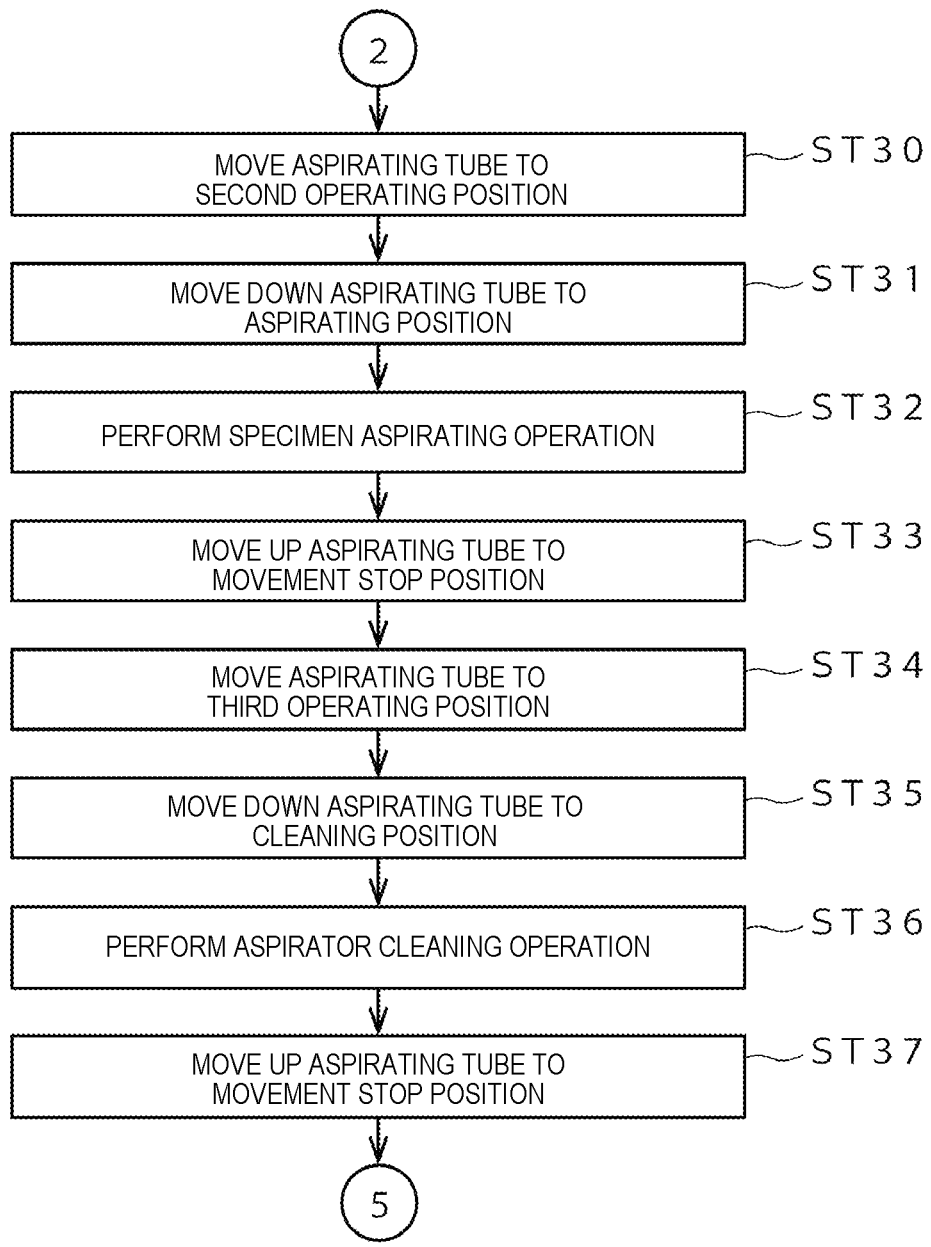
FIG. 14 is a flowchart illustrating the operation of manual aspiration.

In ST23 of FIG. 13, when the input part 35 has received an instruction to execute manual aspiration, the controller 31 proceeds from ST23 to ST30 in FIG. 14. For the manual aspiration, the user places the specimen container C accommodating a specimen in the recess 21 of the housing 50.

In ST30, the controller 31 controls the aspirating tube moving mechanism 720 and moves the aspirating tube 710 to the second region P2. Before proceeding to ST31, the controller 31 may detect whether the specimen container C is placed in the recess 21 using a not-illustrated sensor or the like. When the specimen container C is not placed, the controller 31 may perform an operation to display an error message on the display 34. In addition, before proceeding to ST31, the controller 31 may be configured to determine whether the controller 31 has received an instruction to start aspiration from the input part 35 or an aspiration starting button separately provided and proceed to ST31 only when having received the instruction to start aspiration.

In ST31, the controller 31 starts the manual aspiration. The controller 31 controls the aspirating tube moving mechanism 720 and moves down the aspirating tube 710 from the movement stop position 761$a$ to the aspirating position 761$b$. In this process, at least the tip of the aspirating tube 710 moves out of the housing 50 through the through-hole 50$a$ of the top plate 50G and is inserted into the specimen container C placed in the recess 21.

In ST32, the controller 31 controls the aspirator 32 and causes the aspirating tube 710 to aspirate a previously-determined amount of specimen. If the previously determined amount of specimen cannot be aspirated because the specimen container C accommodates a smaller amount of specimen or the tip of the aspirating tube 710 does not reach the specimen accommodated in the specimen container C, the controller 31 may perform an operation to display an error message on the display 34. In ST33, the controller 31 controls the aspirating tube moving mechanism 720 and moves up the aspirating tube 710 from the aspirating position 761$b$ to the movement stop position 761$a$. The tip of the aspirating tube 710 is thereby retracted into the housing 50.

In ST34, the controller 31 controls the aspirating tube moving mechanism 720 and moves the aspirating tube 710 to the third region P3. In ST35, the controller 31 controls the aspirating tube moving mechanism 720 and moves down the aspirating tube 710 from the movement stop position 763$a$ to the cleaning position 763$b$. In ST36, the controller 31 performs cleaning operation for the aspirator 32. In ST37, the controller 31 controls the aspirating tube moving mechanism 720 and moves up the aspirating tube 710 from the cleaning position 763$b$ to the movement stop position 763$a$. The manual aspiration is thus completed. After the manual aspiration is completed, the controller 31 returns to the automatic aspiration in ST24 of FIG. 13. In ST27, the controller 31 controls the operation of the aspirating tube moving mechanism 720 and moves the aspirating tube 710 to the position in the first region P1 where the next specimen is to be aspirated.

In the case of performing the manual aspiration for plural specimens, the controller 31 may be configured to move to the second region P2 again and perform the manual aspiration for the second specimen without returning to the automatic aspiration after the manual aspiration for the first specimen. In this case, the input part 35 receives the number of specimens that are to be subjected to the manual aspiration, and the controller 31 repeats the manual aspiration for the number of times corresponding to the number of specimens received by the input part 35. The controller 31 returns to the automatic aspiration after the manual aspiration for all the specimens is completed.

Figure 15:
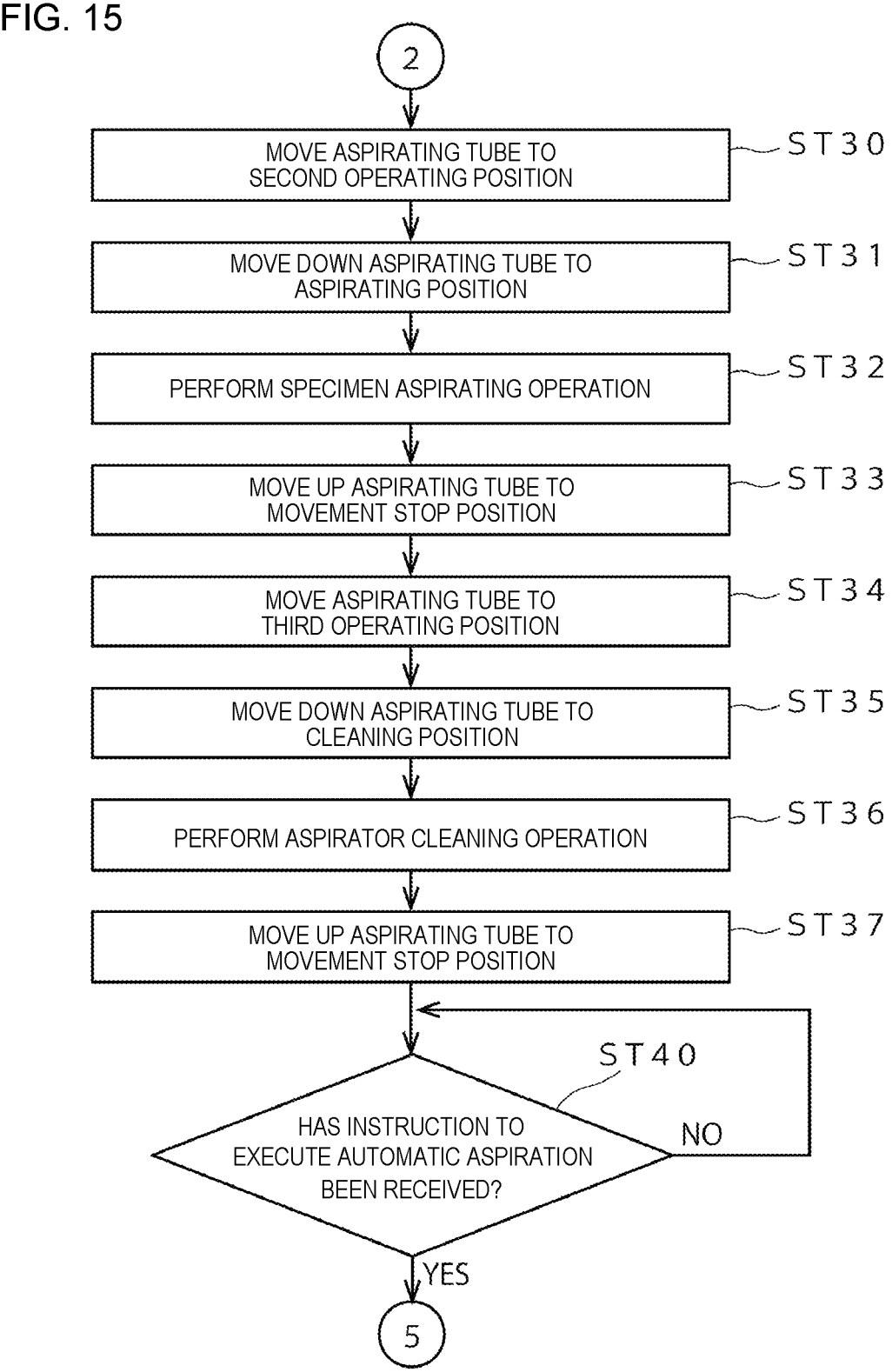
FIG. 15 is a flowchart illustrating another mode of the operation of manual aspiration.

FIG. 15 is a flowchart illustrating another mode of the manual aspiration, additionally including ST40 after ST37 of the flowchart in FIG. 14. The input part 35 is able to receive an instruction to execute automatic aspiration while the operation in the steps ST30 to ST37 is being performed. In ST40, the controller 31 determines whether the input part 35 has received an instruction to execute automatic aspiration. When the input part 35 has received an instruction to execute automatic aspiration, the controller 31 returns to the automatic aspiration of ST24 in FIG. 13. When the input part 35 has not received an instruction to execute automatic aspiration, the aspirating tube 710 remains in the second region P2, waiting for receipt of an instruction to execute automatic aspiration.

Figure 16:
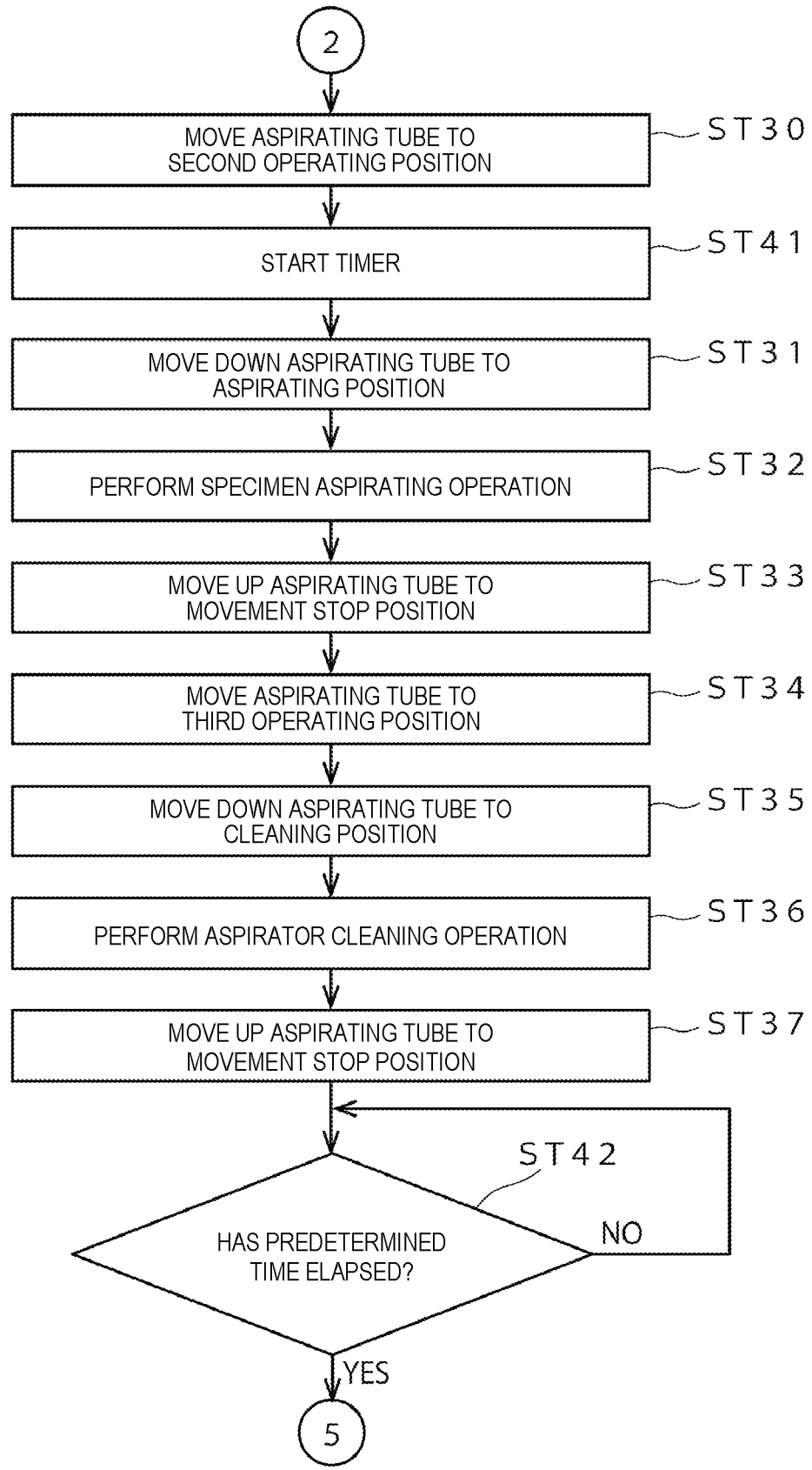
FIG. 16 is a flowchart illustrating another mode of the operation of manual aspiration.

FIG. 16 is a flowchart illustrating another mode of manual aspiration, additionally including ST41 after ST30 of the flowchart in FIG. 14 and ST42 after ST37. In ST30, the aspirating tube 710 moves to the second region P2, and then in ST41, the controller 31 starts time measuring operation with a timer to measure the time elapsed since the start of the manual aspiration. After the steps ST31 to ST37 are performed, in ST 42, the controller 31 determines whether the measured elapsed time exceeds a predetermined time previously stored in the controller 31. When the measured elapsed time exceeds the predetermined time, the controller 31 returns to the automatic aspiration of ST24 in FIG. 13. When the measured elapsed time does not exceed the predetermined time, the controller 31 waits until the measured elapsed time exceeds the predetermined time while the aspirating tube 710 remains in the second region P2. ST41 may be added before ST30.

Another mode of the manual aspiration may additionally include ST41 after ST30 of the flowchart in FIG. 14 and include ST40 and ST42 after ST37. The input part 35 is able to receive an instruction to execute automatic aspiration while the steps ST30, ST41, and ST31 to ST37 are being performed. In ST40, the controller 31 determines whether the input part 35 has received an instruction to execute automatic aspiration. When the input part 35 has not received an instruction to execute automatic aspiration, the controller 31 waits for receipt of an instruction to execute automatic aspiration. When the input part 35 has received an instruction to execute automatic aspiration, the controller 31 proceeds to ST42. The controller 31 determines whether the measured elapsed time exceeds the predetermined time stored in the controller 31. When the measured elapsed time exceeds the predetermined time, the controller 31 returns to automatic aspiration in ST24 of FIG. 13. When the measured elapsed time does not exceed the predetermined time, the controller 31 waits until the measured elapsed time exceeds the predetermined time, and the aspirating tube 710 remains in the second region P2. ST40 may be performed after ST42.

In the examples described in one or more embodiments, the input part 35 receives the instruction to execute manual aspiration during the automatic aspiration of the specimen processing apparatus 30. However, the input part 35 may receive an instruction to execute manual aspiration while the specimen processing apparatus 30 is not performing the automatic aspiration under suspension. In this case, the controller 31 performs the operation from the ST30 to ST37 in FIG. 14.

In one or more embodiments, the cleaning bath 40 is provided in the third region P3, and the controller 31 controls the aspirating tube moving mechanism 720 and moves the aspirating tube 710 to the third region P3 for cleaning operation. However, the cleaning bath 40 does not need to be provided in the third region P3. In this case, the controller 31 does not move the aspirating tube 710 to the third region P3, and cleaning operation for the aspirating tube 710 is not performed. In other words, ST19 to ST22 in FIG. 12 and ST34 to ST37 in FIG. 14 are skipped.

(Specimen Processing Method)

A specimen processing method according to one or more embodiments is a method of processing a specimen with a specimen processing apparatus including: the aspirating tube 710 that aspirates a specimen; and the processing unit 38 that processes the aspirated specimen. The method includes: a step of performing automatic aspiration for specimens with the aspirating tube 710 in a first region P1 covered with a wall constituent member; and a step of moving the aspirating tube 710 to a second region P2, which is separated from the first region, and performing manual aspiration for a specimen with the aspirating tube 710 in the second region P2.

(Processing unit)

The processing unit 38 illustrated in FIG. 11 is a flow cytometer, for example. Hereinafter, an example using a flow cytometer is described using FIGS. 17 and 18.

Figure 17:
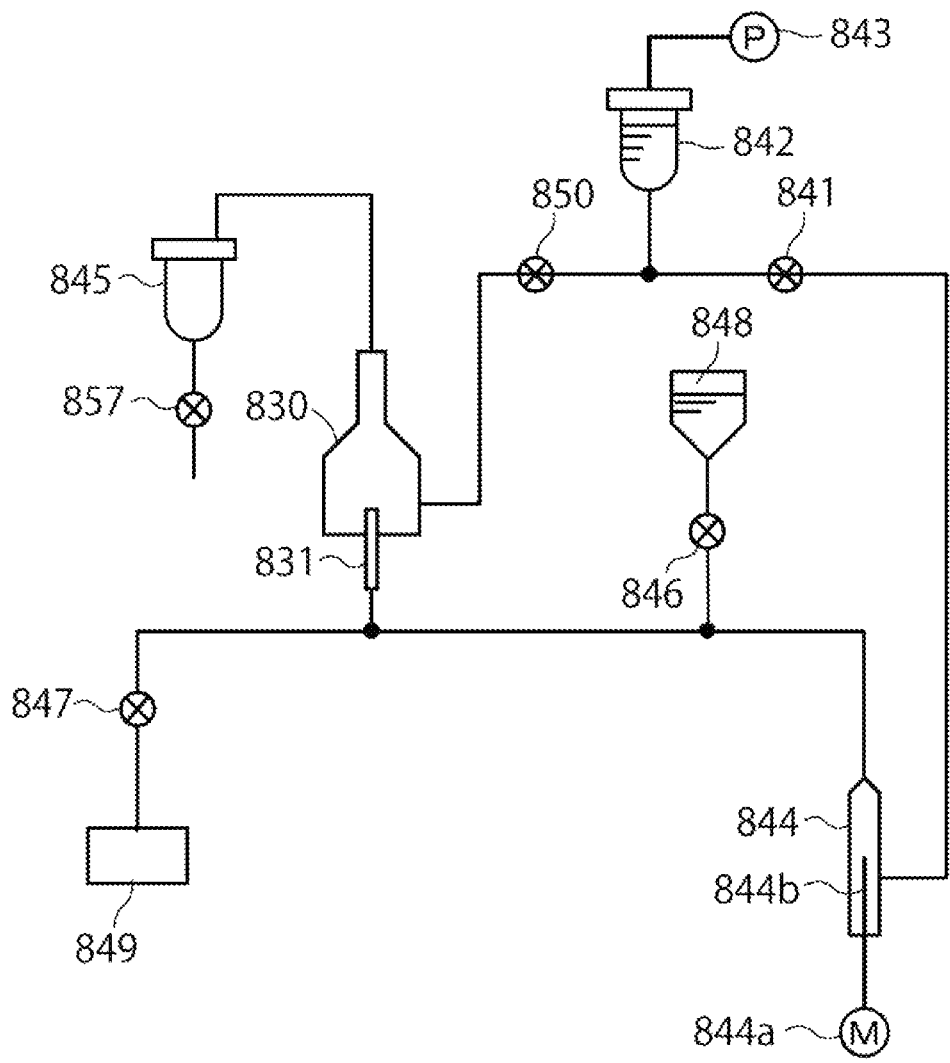
FIG. 17 is a schematic diagram illustrating the configuration of a fluid system of a flow cytometer.

FIG. 17 is a schematic diagram illustrating an example of a fluid system of the flow cytometer. A specimen fed from the aspirator 32 to the flow cytometer is fed to a chamber 848 and is mixed with a specimen transportation reagent if necessary. Hereinafter, the liquid containing a specimen and fed from the chamber 848 to a cell 830 is referred to as particle-containing liquid.

In the measurement step, valves 846 and 847 are opened, and the particle-containing liquid is aspirated from the chamber 848 by negative pressure of an aspirating apparatus 849. When the path between the valve 846 and a nozzle 831 is filled with the particle-containing liquid, the valves 846 and 847 are closed. Next, when a valve 850 is opened, sheath fluid is delivered from a sheath fluid chamber 842, which stores the sheath fluid, to the cell 830 by pressure of a pressure apparatus 843 and is discharged to a waste chamber 845.

Next, when a valve 841 is opened, pressure P from the pressure apparatus 843 is transmitted to a tip or an end of the nozzle 831 through a metering syringe 844. At the tip of the nozzle 831, the pressure of the sheath liquid outside the nozzle 831 is balanced with the pressure of the particle-containing liquid within the nozzle 831. When a piston 844b of the metering syringe 844 is driven in the discharge direction by a motor 844a in that state, therefore, the particle-containing liquid existing between the valve 846 and nozzle 831 is easily discharged from the nozzle 831 and is narrowed by the sheath fluid into a specimen fluid to pass through the cell 830, which is then discharged to the waste chamber 845. In this period, the particles in the specimen contained in the particle-containing liquid are optically measured. When the drive of the piston 844b of the metering syringe 844 is stopped, the measurement step ends.

Next, the nozzle 831, cell 830, and the like are cleaned. In the cleaning step, the motor 844a is reversed to draw back the piston 844b in the aspiration direction, and the metering syringe 844 returns to the initial state. Since the valves 841 and 850 are opened, the sheath fluid is delivered from the sheath fluid chamber 842 by the pressure P applied from the pressure apparatus 843 and is discharged to the waste chamber 845 through the valve 841, metering syringe 844, and nozzle 831. The sheath fluid is also discharged to the waste chamber 845 through the valve 850 and cell 830, and the valves 841 and 850 are then closed after a predetermined time. The metering syringe 844, nozzle 831, and cell 830 and the path therebetween are thereby cleaned with the sheath fluid. A valve 857 is a valve to discharge waste out of the waste chamber 845 and is opened and closed when needed. The pressure apparatus 843, motor 844a, aspirating apparatus 849, valves 841, 846, 847, 850, and 857, and the like are connected to a signal processing unit, and the operations thereof are controlled by the signal processing unit.

Figure 18:
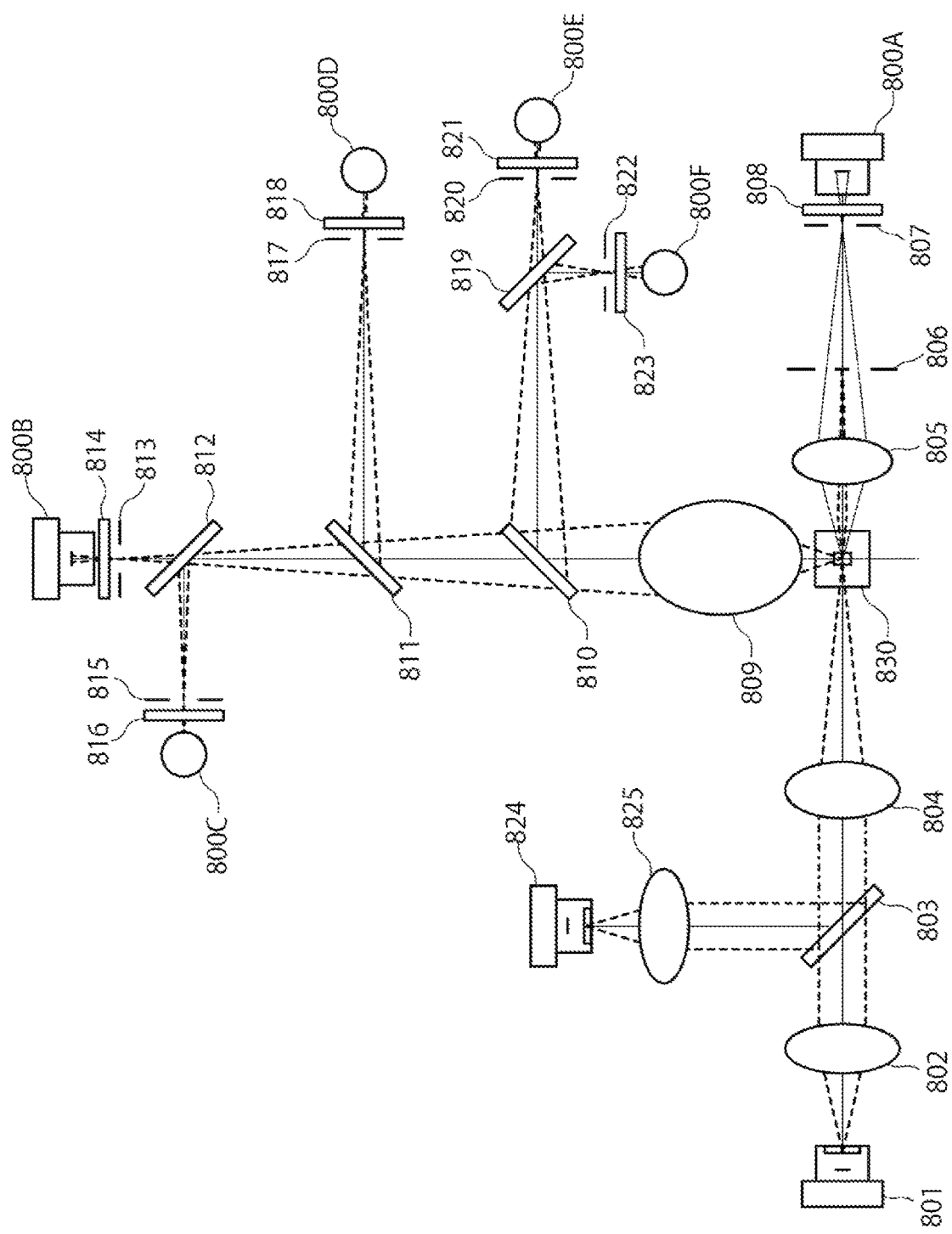
FIG. 18 is a schematic diagram illustrating the configuration of an optical system of a flow cytometer.

FIG. 18 is a schematic diagram illustrating an example of the optical system of the flow cytometer. The flow cytometer includes: the cell 830 receiving the particle-containing liquid; light sources 801 and 824 that project light onto particles passing through the cell 830; and photosensitive elements 800A to 800F that detect optical information of light derived from the particles and converts the detected information into electrical signals to output the same as detection signals.

The particles contained in the particle-containing liquid preferably emit one or two or more rays of light when irradiated with predetermined light. The rays of light emitted from the particles that are irradiated with the predetermined light are collectively referred to as particle-derived light. The particle-derived light includes scattered light, luminescence, and the like. The particle-derived light may be light having any wavelength. The particle-derived light is preferably light having a peak wavelength in a range from 400 to 850 nm. To be more specific, the particle-derived light is preferably fluorescence. The particle-derived light may be light emitted from a substance itself contained in the particles. Alternatively, the particles may be labeled with a luminescent material, such as a fluorescent dye, and light emitted from the luminescent material is detected as the particle-derived light. The particle-derived light is preferably light having a peak wavelength that differs from antigen to antigen. In one or more embodiments, the fluorescence derived from the particles is derived from the fluorescent dye used to label each antibody contained in the testing reagent.

The optical information is information contained in one, two, or more light wavelength spectra emitted from the particles. Each light wavelength spectrum includes the light wavelengths and light wavelength range included in the light wavelength spectrum and intensities of the light wavelengths or light wavelength range. The light wavelengths and wavelength range are specified depending on which of later-described one, two, or more photosensitive elements has received the light. The intensities of the individual light wavelengths and light wavelength range are specified depending on the electric signals outputted from the photosensitive elements having received light.

Hereinafter, a specific description is given of the case where the particle-derived light is scattered light or fluorescence as an example. The light emitted from the light source 801 travels through a collimating lens 802, a dichroic mirror 803, and a light condenser lens 804 to be projected onto the cell 830. Forward-scattered light from the particle-derived light passing through the cell 830 is condensed by the condenser lens 805 and travels through a beam stopper 806, a pinhole plate 807, and a bandpass filter 808 to enter the photosensitive element 800A.

On the other hand, side scattered light and side fluorescence of the particle-derived light passing through the cell 830 are condensed by the condenser lens 809. The side scattered light is transmitted through dichroic mirrors 810, 811, and 812, a pinhole plate 813, and a bandpass filter 814 to enter the photosensitive element 800B. Side florescence having a wavelength of not less than 520 nm and not more than 542 nm is transmitted through the dichroic mirrors 810 and 811 and is reflected on the dichroic mirror 812 to pass through a pinhole plate 815 and a bandpass filter 816 and enter the photosensitive element 800C. Side florescence having a wavelength of not less than 570 nm and not more than 620 nm passes through the dichroic mirror 810 and is reflected on the dichroic mirror 811 to pass through a pinhole plate 817 and a bandpass filter 818 and enter the photosensitive element 800D. Side florescence having a wavelength of not less than 670 nm and not more than 800 nm is reflected on the dichroic mirror 810 and is transmitted through a dichroic mirror 819 to pass through a pinhole plate 820 and a bandpass filter 821 and enter the photosensitive element 800E.

Light emitted from the light source 824 travels through a collimating lens 825, the dichroic mirror 803, and the light condenser lens 804 to be projected onto the cell 830. The side fluorescence of light derived from the particles passing through the cell 830 is condensed by the condenser lens 809. Side fluorescence of not less than 662.5 nm and not more than 687.5 nm is reflected on the dichroic mirror 810 and then reflected on the dichroic mirror 819. The reflected side fluorescence passes through a pinhole plate 822 and a bandpass filter 823 to enter the photosensitive element 800F.

In the example illustrated in FIG. 18, the light source 801 includes a laser diode with a wavelength of 488 nm, and the light source 824 is a laser diode with a wavelength of 642 nm. The cell 830 is a sheath flow cell. The photosensitive element 800A, which receives forward scattered light, is a photodiode, and the photosensitive element 800B, which receives side scattered light, is an avalanche photodiode (APD). The photosensitive elements 800C to 800F, which receive side fluorescence, are photomultiplier tubes (PMTs).

In the flow cytometer illustrated in FIG. 18, the number of photosensitive elements 800C to 800F, which receive side fluorescence, is four. The flow cytometer illustrated in this example includes four photosensitive elements for detecting fluorescence and is able to simultaneously measure fluorescences of four colors in total.

The detection signals outputted from the respective photosensitive elements 800A to 800F are amplified by an amplifier (not illustrated) and is AD converted by an AD converter (not illustrated) into digital data. The detection signals as the digital data is transmitted to a signal processing unit (not illustrated) for an analysis of particles. The amplifier is a known amplifier including an operational amplifier and the like, for example.

The flow cytometer may include one, two, or more light sources. The light sources are selected depending on the wavelength range of the particle-derived light. When the flow cytometer includes two or more light sources, the light sources preferably emit light having different peak wavelengths.

The number of photodiodes, dichroic mirrors, and bandpass filters can be changed in accordance with the number of peak wavelengths of particle-derived light. In addition, the types of the photodiodes, dichroic mirrors, and bandpass filters are selected in accordance with the peak wavelength of the particle-derived light or wavelength range and the intensity thereof.

The signal processing unit receives from the user through the input part 35, information concerning detection sensitivity of the photosensitive elements 800A to 800F at detecting scattered light and fluorescence, information concerning fluorescence correction in accordance with the combination of detected fluorescences, and information concerning gating for selecting a distribution region of particles to be detected. The signal processing unit controls the light sources 801 and 824 and the like based on the above information so as to provide proper optical information. The signal processing unit of the flow cytometer may be included in the controller 31 or provided separately from the controller 31.

The processing unit 38 may include a processing apparatus performing a pretreatment based on Bead, Emulsion, Amplification, and Magnetics (BEAMing) for specimens to be accommodated in the wells 601 of the plate 600. Examples of the pretreatment performed based on BEAMing by the processing apparatus include DNA extraction, dilution, emulsion preparation, PCR, demulsification, hybridization, cleaning, and the like.

Hereinabove, one or more embodiments are described. The present invention is not limited to the aforementioned embodiments and can be variously changed without departing from the scope of the invention.

The invention claimed is:

1. A specimen processing apparatus comprising:
a housing;
an aspirating tube configured to aspirate a specimen in automatic aspiration and manual aspiration;
an aspirating tube moving mechanism configured to move the aspirating tube between a first region in which the automatic aspiration is performed inside the housing in an aspirating position of the aspirating tube and a second region in which the manual aspiration is performed outside of the housing in an aspirating position of the aspirating tube, the aspirating position of the aspirating tube in the second region separated from the aspirating position of the aspirating tube in the first region by the housing; and
a processing unit that processes the specimen aspirated by the aspirating tube, wherein
the aspirating tube moving mechanism is configured to move the aspirating tube to the aspirating position in the second region so that a tip of the aspirating tube is located outside the housing.

2. The specimen processing apparatus according to claim 1, wherein the aspirating tube moving mechanism is configured to move the aspirating tube linearly between the first region and the second region.

3. The specimen processing apparatus according to claim 1,
wherein the specimen comprises a plurality of specimens, the specimen processing apparatus further comprising:
a specimen transporting mechanism configured to transport, to the first region, a holder holding the plurality of specimens.

4. The specimen processing apparatus according to claim 3, wherein
the aspirating tube moving mechanism is configured to move the aspirating tube in a first direction linearly between the first region and the second region and to cause the aspirating tube to aspirate the plurality of specimens sequentially, and
the specimen transporting mechanism configured to transport the holder in a second direction orthogonal to the first direction.

5. The specimen processing apparatus according to claim 3, wherein
the housing accommodates the specimen transporting mechanism.

6. The specimen processing apparatus according to claim 3, wherein
the housing accommodates a setting position in which the holder is set and a transporting path in which the holder is transported from the setting position to the first region.

7. The specimen processing apparatus according to claim 6, wherein
the housing comprises a lid, and
the holder can be set in the setting position in a condition in which the lid is open.

8. The specimen processing apparatus according to claim 1, comprising:
a cleaner comprising a cleaning bath configured to clean the aspirating tube, wherein
the aspirating tube moving mechanism is configured to move the aspirating tube to the cleaner.

9. The specimen processing apparatus according to claim 8, wherein
the cleaner is located between the first region and the second region.

10. The specimen processing apparatus according to claim 1, further comprising:
a controller that controls an operation of the aspirating tube moving mechanism, wherein
in a condition in which the controller receives an instruction for the manual aspiration, the controller causes the aspirating tube moving mechanism to move the aspirating tube to the second region.

11. The specimen processing apparatus according to claim 10, wherein
the controller causes the aspirating tube moving mechanism to move the aspirating tube to the first region after the manual aspiration is completed or a predetermined period of time passes after the manual aspiration is started.

12. The specimen processing apparatus according to claim 10, wherein
in a condition in which the controller receives an instruction for the automatic aspiration during the manual aspiration, the controller causes the aspirating tube moving mechanism to move the aspirating tube to the first region after the manual aspiration is completed or a predetermined period of time passes after the manual aspiration is started.

13. The specimen processing apparatus according to claim 1, wherein
the specimen contains nucleic acid, and
the processing unit processes the nucleic acid.

14. The specimen processing apparatus according to claim 1, wherein
in the automatic aspiration, the aspirating tube agitates the specimen before the aspirating tube aspirates the specimen.

15. The specimen processing apparatus according to claim 1, wherein
the specimen comprises a plurality of specimens, and
in the automatic aspiration, the aspirating tube aspirates the plurality of specimens from a holder holding the plurality of specimens.

16. The specimen processing apparatus according to claim 1, wherein
in the manual aspiration, the aspirating tube aspirates the specimen from a specimen container held by a user.

17. The specimen processing apparatus according to claim 1, wherein
the housing comprises a through-hole, and
the aspirating tube moving mechanism is configured to move the aspirating tube to the aspirating position in the second region so that the tip of the aspirating tube is located outside the housing through the through-hole.

18. A specimen processing method with the specimen processing apparatus according to claim 1, the method comprising:
performing, in the first region, automatic aspiration for the specimen by the aspirating tube; and
performing, in the second region, manual aspiration for the specimen by the aspirating tube moved to the second region from the first region.

* * * * *